(12) United States Patent
Suzuki et al.

(10) Patent No.: US 12,272,952 B2
(45) Date of Patent: Apr. 8, 2025

(54) POWER CONVERSION DEVICE CONTROL SYSTEM

(71) Applicants: TOKYO ELECTRIC POWER COMPANY HOLDINGS, INCORPORATED, Tokyo (JP); MEIDENSHA CORPORATION, Tokyo (JP)

(72) Inventors: Kenichi Suzuki, Tokyo (JP); Naoto Maeda, Tokyo (JP); Jun Takami, Tokyo (JP); Ryota Samejima, Tokyo (JP); Hideki Noda, Tokyo (JP); Jun Isoo, Tokyo (JP); Kazu Shoji, Numazu (JP)

(73) Assignees: TOKYO ELECTRIC POWER COMPANY HOLDINGS, INCORPORATED, Tokyo (JP); MEIDENSHA CORPORATION, Tokyo (JP)

( * ) Notice: Subject to any disclaimer, the term of this patent is extended or adjusted under 35 U.S.C. 154(b) by 310 days.

(21) Appl. No.: 17/909,213

(22) PCT Filed: Aug. 6, 2020

(86) PCT No.: PCT/JP2020/030142
§ 371 (c)(1),
(2) Date: Sep. 2, 2022

(87) PCT Pub. No.: WO2021/176746
PCT Pub. Date: Sep. 10, 2021

(65) Prior Publication Data
US 2023/0087529 A1 Mar. 23, 2023

(30) Foreign Application Priority Data

Mar. 5, 2020 (JP) .................................. 2020-037344
Mar. 5, 2020 (JP) .................................. 2020-037346

(51) Int. Cl.
H02J 3/32 (2006.01)
H02J 3/38 (2006.01)
H02M 7/48 (2007.01)

(52) U.S. Cl.
CPC ................ *H02J 3/32* (2013.01); *H02J 3/381* (2013.01); *H02M 7/4815* (2021.05)

(58) Field of Classification Search
CPC .... H02J 3/32; H02J 3/381; H02J 3/38; H02M 7/4815; H02M 1/0019; H02M 7/53873;
(Continued)

(56) References Cited

U.S. PATENT DOCUMENTS

2006/0132074 A1 6/2006 Yang et al.
2014/0152110 A1 6/2014 Sugimoto et al.
(Continued)

FOREIGN PATENT DOCUMENTS

JP 2007-244068 A 9/2007
JP 2014-168351 A 9/2014
(Continued)

OTHER PUBLICATIONS

Toshiaki Kikuma, "Overcurrent Control Scheme for Virtual Synchronous Generator", The Institute of Electrical Engineers of Japan, IEEJ, Sep. 12, 2018, 2 pages.
U.S. Appl. No. 17/633,794, filed Feb. 8, 2022, Suzuki et al.

*Primary Examiner* — Ziaul Karim
(74) *Attorney, Agent, or Firm* — Foley & Lardner LLP

(57) ABSTRACT

A control system is provided for a power conversion system having a power converter that controls a virtual synchronous generator simulating a synchronous generator and interconnected to a power grid. The control system has a virtual synchronous impedance compensation block inputting an output current detection value of the power converter and a set voltage amplitude command value, simulating a voltage
(Continued)

GENERAL CONFIGURATION drop due to a virtual synchronous impedance, and calculating an output voltage command value and an internal induced voltage according to the simulated voltage drop; a virtual synchronous generator model determining an angular frequency simulating the synchronous generator; and a PCS output voltage control unit performing control so that an output voltage of the power conversion system coincides with the output voltage command value calculated by the virtual synchronous impedance compensation block.

3 Claims, 16 Drawing Sheets

(58) Field of Classification Search
CPC ............ H02M 7/5395; H02M 1/0025; H02M 1/0003; H02M 7/53871
See application file for complete search history.

(56) References Cited

U.S. PATENT DOCUMENTS

| | | |
|---|---|---|
| 2016/0006338 A1 | 1/2016 | Sakimoto et al. |
| 2017/0047861 A1* | 2/2017 | Sakimoto ............ H02M 7/5395 |
| 2018/0145582 A1 | 5/2018 | Shuai et al. |
| 2020/0099315 A1* | 3/2020 | Lee ................... H02M 7/53871 |
| 2021/0194383 A1 | 6/2021 | Tsuruma et al. |
| 2022/0077688 A1* | 3/2022 | Patarroyo ................. H02J 3/46 |
| 2022/0321041 A1* | 10/2022 | Ebrahimzadehveshareh ............... H02J 3/50 |
| 2022/0399801 A1 | 12/2022 | Suzuki et al. |

FOREIGN PATENT DOCUMENTS

| | | |
|---|---|---|
| JP | 2015-211617 A | 11/2015 |
| JP | 5830941 B2 | 12/2015 |
| JP | 6084863 B2 | 2/2017 |
| JP | 2019-004571 A | 1/2019 |
| JP | 2019-080476 A | 5/2019 |
| WO | WO-2013/008413 A1 | 1/2013 |

* cited by examiner

VIRTUAL IMPEDANCE MODEL

GENERAL CONFIGURATION

VECTOR DIAGRAM OF
VIRTUAL SYNCHRONOUS IMPEDANCE MODEL
(EMBODIMENT 1)

BLOCK DIAGRAM OF Zs COMPENSATION BLOCK (EMBODIMENT 1)

VECTOR DIAGRAM OF
VIRTUAL SYNCHRONOUS IMPEDANCE MODEL
(EMBODIMENT 2)

BLOCK DIAGRAM OF
Zs COMPENSATION BLOCK (EMBODIMENT 2)

Vac* CALCULATION

Ef CALCULATION

VECTOR DIAGRAM OF
VIRTUAL SYNCHRONOUS IMPEDANCE MODEL
(EMBODIMENT 3)

BLOCK DIAGRAM OF
Zs COMPENSATION BLOCK (EMBODIMENT 3)

Vac* CALCULATION

Ef CALCULATION

VECTOR DIAGRAM OF
VIRTUAL SYNCHRONOUS IMPEDANCE MODEL
(EMBODIMENT 4)

BLOCK DIAGRAM OF
Zs COMPENSATION BLOCK (EMBODIMENT 4)

VIRTUAL IMPEDANCE MODEL (EMBODIMENT 5)

GENERAL CONFIGURATION

VECTOR DIAGRAM OF
VIRTUAL SYNCHRONOUS IMPEDANCE MODEL
(EMBODIMENT 5)

BLOCK DIAGRAM OF
Zs COMPENSATION BLOCK (EMBODIMENT 5)

VIRTUAL IMPEDANCE MODEL (EMBODIMENT 6)

VECTOR DIAGRAM OF
VIRTUAL SYNCHRONOUS IMPEDANCE MODEL
(EMBODIMENT 6)

BLOCK DIAGRAM OF
Zs COMPENSATION BLOCK (EMBODIMENT 6)

POWER CONVERSION DEVICE CONTROL SYSTEM

TECHNICAL FIELD

The present invention relates to a control system of a power conversion device (a power conversion system), and relates to a method of simulating a voltage drop generated by a virtual synchronous impedance model according to an output current and controlling an output voltage amplitude in a voltage control-type power converter that controls a virtual synchronous generator simulating a synchronous generator.

BACKGROUND ART

FIG. 1 shows, at an upper side thereof, a configuration of a PCS (Power Conversion System) in which a power converter that converts DC power of a DC power supply such as a storage battery into AC power is provided and an output of the power converter is interconnected to a power system (a power grid) through an LC filter. FIG. 1 also shows, at a lower side thereof, a configuration of a virtual synchronous impedance model.

As a conventional virtual synchronous power generation system by the storage battery, a virtual synchronous power generation system disclosed in, for instance, Patent Document 1 has been proposed.

CITATION LIST

Patent Document

Patent Document 1: Japanese Unexamined Patent Application Publication No. 2019-080476

SUMMARY OF THE INVENTION

In FIG. 1, in a voltage control-type power converter that controls a virtual synchronous generator simulating a synchronous generator, by voltage-controlling a voltage Vac of a filter capacitor C with a value obtained by subtracting an output voltage drop Vz caused by a virtual synchronous impedance Zs from an internal induced voltage Ef of the power conversion system (PCS) being a voltage command value Vac*, a synchronizing power by the virtual synchronous impedance is reproduced.

On the other hand, a voltage amplitude |Vac| needs to coincide with a voltage amplitude command value |Vac|*. Since an amount of the voltage drop by the virtual synchronous impedance is uniquely (univocally) determined by a load current, control that makes the voltage amplitude |Vac| coincide with the voltage amplitude command value |Vac|* according to the voltage drop amount is necessary, and a control system that can quickly respond even at a time of load fluctuation is desirable.

The present invention is an invention that solves the above problem, and an object of the present invention is to provide a control system of a power conversion device (a power conversion system) which is capable of quick response of output voltage amplitude control even at a time of load fluctuation while reproducing the synchronizing power by the virtual synchronous impedance.

A control system of a power conversion system, to solve the above problem, recited in claim 1, wherein the power conversion system has a power converter that controls a virtual synchronous generator simulating a synchronous generator and converts DC power of a DC power supply into AC power, wherein an output of the power converter is interconnected to a power grid through an LC filter, the control system comprises: a virtual synchronous impedance compensation block configured to input an output current detection value obtained by detecting an output current of the power converter and a set voltage amplitude command value, simulate a voltage drop generated by flow of the output current of the power converter to a virtual synchronous impedance, and calculate an output voltage command value and an internal induced voltage of the virtual synchronous generator according to the simulated voltage drop; a virtual synchronous generator model configured to determine an angular frequency simulating the synchronous generator; and an output voltage control unit configured to perform control on the basis of the angular frequency determined by the virtual synchronous generator model so that an output voltage of the power conversion system coincides with the output voltage command value calculated by the virtual synchronous impedance compensation block.

As the control system of the power conversion system recited in claim 2, in the control system in claim 1, the virtual synchronous impedance compensation block is configured to, from the output current detection value Iac, the virtual synchronous impedance Zs and the set voltage amplitude command value |Vac|*, calculate the output voltage command value Vac* and the internal induced voltage Ef of an operating point where an amplitude of the output voltage command value Vac* is |Vac|* and also the internal induced voltage Ef exists on a d-axis, with the internal induced voltage Ef being set as a reference phase.

As the control system of the power conversion system recited in claim 3, in the control system in claim 1, the virtual synchronous impedance compensation block is configured to, from the output current detection value Iac, the virtual synchronous impedance Zs and the set voltage amplitude command value |Vac|*, calculates the output voltage command value Vac* and the internal induced voltage Ef of an operating point where an amplitude of the output voltage command value Vac* is |Vac|* and also the output voltage command value Vac* exists on a d-axis, with the output voltage command value Vac* being set as a reference phase.

As the control system of the power conversion system recited in claim 4, in the control system in claim 1, the virtual synchronous impedance compensation block is configured to, with the internal induced voltage Ef being set as a reference phase, calculate a phase difference δ from the output current detection value Iac, the virtual synchronous impedance Zs and an internal induced voltage calculated in a previous control cycle, calculate the output voltage command value Vac* by performing a rotational coordinate conversion of the set voltage amplitude command value |Vac|* with the phase difference δ, and calculate the internal induced voltage Ef from the calculated output voltage command value Vac*, the output current detection value Iac and the virtual synchronous impedance Zs.

As the control system of the power conversion system recited in claim 5, in the control system in claim 1, the virtual synchronous impedance compensation block is configured to, with the internal induced voltage Ef being set as a reference phase, calculate a phase difference δ from the output current detection value Iac, the virtual synchronous impedance Zs and the set voltage amplitude command value |Vac|*, calculate the output voltage command value Vac* by performing a rotational coordinate conversion of the set voltage amplitude command value |Vac|* with the phase difference δ, and calculate the internal induced voltage Ef from the calculated output voltage command value Vac*, the output current detection value Iac and the virtual synchronous impedance Zs.

As the control system of the power conversion system recited in claim 6, in the control system in claim 2, the virtual synchronous impedance compensation block has
a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by converting the output current detection value Iac into the d-axis and a q-axis;

[Expression 1]

$$\dot{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)
a $\sin^{-1}$ calculation unit configured to calculate an output voltage phase δ by calculating the following expression (2) on the basis of the voltage drop Vz_q calculated by the Vz calculation unit and the voltage amplitude command value |Vac|*;

[Expression 2]

$$\delta = \sin^{-1}\left(\frac{V_{Z\_q}}{|V_{ac}|^*}\right) \quad (2)$$

a cos calculation unit configured to calculate a cos δ that is a cos component of the output voltage phase δ;
a multiplier configured to, by multiplying the voltage amplitude command value |Vac|* by an output of the cos calculation unit, obtain an output voltage command value Vac_d* of the operating point where the amplitude of the output voltage command value Vac* is |Vac|* and also the internal induced voltage Ef exists on the d-axis; and an adder configured to, by adding the voltage drop Vz_d calculated by the Vz calculation unit to the output voltage command value Vac_d* obtained by the multiplier, obtain the internal induced voltage Ef of the operating point where the amplitude of the output voltage command value Vac* is |Vac|* and also the internal induced voltage Ef exists on the d-axis.

As the control system of the power conversion system recited in claim 7, in the control system in claim 3, the virtual synchronous impedance compensation block has
a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by converting the output current detection value Iac into the d-axis and a q-axis; and

[Expression 1]

$$\dot{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)
an adder configured to, by adding the voltage drop Vz_d calculated by the Vz calculation unit to the voltage amplitude command value |Vac|*, obtain the internal induced voltage Ef of the operating point where the amplitude of the output voltage command value Vac* is |Vac|* and also the output voltage command value Vac* exists on the d-axis.

As the control system of the power conversion system recited in claim 8, in the control system in claim 4, the virtual synchronous impedance compensation block has
a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by converting the output current detection value Iac into the d-axis and a q-axis;

[Expression 1]

$$\dot{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)
a buffer configured to temporarily store the internal induced voltage Ef calculated in each control cycle; a $\tan^{-1}$ calculation unit configured to obtain the phase difference δ by calculating the following expression (7) on the basis of an internal induced voltage Ef_d ($Z^{-1}$) calculated in a previous control cycle and stored in the buffer and the voltage drops Vz_d and Vz_q calculated by the Vz calculation unit;

[Expression 7]

$$\delta = \tan^{-1}\left(\frac{-V_{Z\_q}}{E_f(z^{-1}) - V_{Z\_d}}\right) \quad (7)$$

a rotational matrix operation unit configured to calculate the output voltage command value Vac* by performing a rotational coordinate conversion of the voltage amplitude command value |Vac|* with the phase difference δ obtained by the $\tan^{-1}$ calculation unit along the following expression (8); and

[Expression 8]

$$\dot{V}_{ac}^* = \begin{bmatrix} V_{ac\_d}^* \\ V_{ac\_q}^* \end{bmatrix} = \begin{bmatrix} \cos\delta & -\sin\delta \\ \sin\delta & \cos\delta \end{bmatrix} \begin{bmatrix} |V_{ac}|^* \\ 0 \end{bmatrix} = \begin{bmatrix} |V_{ac}|^*\cos\delta \\ |V_{ac}|^*\sin\delta \end{bmatrix} \quad (8)$$

an adder configured to calculate the internal induced voltage Ef by adding the voltage drop Vz_d calculated by the Vz calculation unit to the output voltage command value Vac* calculated by the rotational matrix operation unit.

As the control system of the power conversion system recited in claim 9, in the control system in claim 5, the virtual synchronous impedance compensation block has
a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by converting the output current detection value Iac into the d-axis and a q-axis;

[Expression 1]

$$\vec{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)

a $\tan^{-1}$ calculation unit configured to obtain the phase difference δ by calculating the following expression (10) on the basis of the voltage amplitude command value |Vac|* and the voltage drops Vz_d and Vz_q calculated by the Vz calculation unit;

[Expression 10]

$$\delta = \tan^{-1}\left(\frac{-V_{Z\_q}}{|V_{ac}|^* - V_{Z\_d}}\right) \quad (10)$$

a rotational matrix operation unit configured to calculate the output voltage command value Vac* by performing a rotational coordinate conversion of the voltage amplitude command value |Vac|* with the phase difference δ obtained by the $\tan^{-1}$ calculation unit; and an adder configured to calculate the internal induced voltage Ef by adding the voltage drop Vz_d calculated by the Vz calculation unit to the output voltage command value Vac* calculated by the rotational matrix operation unit.

A control system of a power conversion system recited in claim 10, wherein the power conversion system has a power converter that controls a virtual synchronous generator simulating a synchronous generator and converts DC power of a DC power supply into AC power, wherein an output of the power converter is interconnected to a power grid through an LC filter and an interconnection transformer, the control system comprises: a virtual synchronous impedance compensation block configured to input an output current detection value obtained by detecting an output current of the power converter and a set voltage amplitude command value |V|*, simulate voltage drops generated by flow of the output current of the power converter to a virtual synchronous impedance and the transformer, and calculate an output voltage command value Vac* and an internal induced voltage Ef of the virtual synchronous generator according to the simulated voltage drops; a virtual synchronous generator model configured to determine an angular frequency simulating the synchronous generator; and an output voltage control unit configured to perform control so that an output voltage Vac of the power conversion system coincides with the output voltage command value Vac* calculated by the virtual synchronous impedance compensation block, wherein the virtual synchronous impedance compensation block is configured to, from the output current detection value Iac, the virtual synchronous impedance Zs, an impedance Ztr of the transformer and the set voltage amplitude command value |V|*, calculate the output voltage command value Vac* and the internal induced voltage Ef of an operating point where an amplitude of an interconnection point voltage Vsys of the power grid is |V|* and also the internal induced voltage Ef exists on a d-axis, with the internal induced voltage Ef being set as a reference phase.

As the control system of the power conversion system recited in claim 11, in the control system in claim 10, the virtual synchronous impedance compensation block has a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by performing a rotational coordinate conversion of the output current detection value Iac with an internal phase that is determined from the angular frequency determined by the virtual synchronous generator model;

[Expression 1]

$$\vec{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)

a Vtr calculation unit configured to calculate a voltage drop Vtr caused by the transformer by calculating the following expression (11) on the basis of the d-axis current detection value Iac_d and the q-axis current detection value Iac_q each obtained by converting the output current detection value Iac into the d-axis and a q-axis and the impedance Ztr of the transformer;

[Expression 11]

$$\vec{V}_{tr} = \begin{bmatrix} V_{tr\_d} \\ V_{tr\_q} \end{bmatrix} = \begin{bmatrix} Rtr & -Xtr \\ Xtr & Rtr \end{bmatrix} \begin{bmatrix} I_{ac\_d} \\ I_{ac\_q} \end{bmatrix} \quad (11)$$

(Here, Rtr is a resistance component of Ztr, and Xtr is a reactance component of Ztr)

a $\sin^{-1}$ calculation unit configured to calculate a grid voltage phase δ by calculating the following expression (12) on the basis of the voltage drop Vz_q calculated by the Vz calculation unit and the voltage amplitude command value |V|*;

[Expression 12]

$$\delta = \sin^{-1}\left(\frac{V_{Z\_q}}{|V|^*}\right) \quad (12)$$

a cos calculation unit configured to calculate a cos δ that is a cos component of the grid voltage phase δ; a multiplier configured to multiply the voltage amplitude command value |V|* by an output of the cos calculation unit; an adder configured to, by adding the voltage drop Vz_d calculated by the Vz calculation unit to a multiplication output of the multiplier, output an internal induced voltage Ef_d of an operating point where the amplitude of the interconnection point voltage Vsys of the power grid is |V|*, the internal induced voltage Ef exists on the d-axis and also compensation is performed so as to cancel out the voltage drop Vtr due to the transformer; a first subtractor configured to subtract a voltage drop Vtr_d calculated by the Vtr calculation unit from the voltage drop Vz_d calculated by the Vz calculation unit; a second subtractor configured to, by subtracting a subtraction output of the first subtractor from the internal induced voltage Ef_d calculated by the adder, output an output voltage command value Vac_d* of the operating point where the amplitude of the interconnection point voltage Vsys of the power grid is |V|*, the internal induced voltage Ef exists on the d-axis and also compensation is performed so as to cancel out the voltage drop Vtr due to the transformer;

a third subtractor configured to subtract a voltage drop Vtr_q calculated by the Vtr calculation unit from the voltage drop Vz_q calculated by the Vz calculation unit; and a polarity reverser configured to reverse a polarity of a deviation output of the third subtractor and output an output voltage command value Vac_q*, and the control of the output voltage control unit is performed on d-q coordinates obtained by performing a rotational coordinate conversion with the internal phase that is determined from the angular frequency determined by the virtual synchronous generator model.

As the control system of the power conversion system recited in claim 12, in the control system in claim 10, the virtual synchronous impedance compensation block has a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by performing a rotational coordinate conversion of the output current detection value Iac with an internal phase that is determined from the angular frequency determined by the virtual synchronous generator model;

[Expression 1]

$$\dot{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)

a Vtr calculation unit configured to calculate a voltage drop Vtr caused by the transformer by calculating the following expression (11) on the basis of the d-axis current detection value Iac_d and the q-axis current detection value Iac_q each obtained by converting the output current detection value Iac into the d-axis and a q-axis and the impedance Ztr of the transformer;

[Expression 11]

$$\dot{V}_{tr} = \begin{bmatrix} V_{tr\_d} \\ V_{tr\_q} \end{bmatrix} = \begin{bmatrix} Rtr & -Xtr \\ Xtr & Rtr \end{bmatrix} \begin{bmatrix} I_{ac\_d} \\ I_{ac\_q} \end{bmatrix} \quad (11)$$

(Here, Rtr is a resistance component of Ztr, and Xtr is a reactance component of Ztr)

a first adder configured to add a voltage drop Vtr_d calculated by the Vtr calculation unit to the voltage drop Vz_d calculated by the Vz calculation unit;

a second adder configured to add a voltage drop Vtr_q calculated by the Vtr calculation unit to the voltage drop Vz_q calculated by the Vz calculation unit;

a sin$^{-1}$ calculation unit configured to calculate a grid voltage phase δ by calculating the following expression (16) on the basis of an addition output of the second adder and the voltage amplitude command value |V|;

[Expression 16]

$$\delta = \sin^{-1}\left(\frac{V_{Z\_q} + V_{tr\_q}}{|V|^*}\right) \quad (16)$$

a cos calculation unit configured to calculate a cos δ that is a cos component of the grid voltage phase δ;

a multiplier configured to multiply the voltage amplitude command value |V|* by an output of the cos calculation unit;

a third adder configured to, by adding an addition output of the first adder to a multiplication output of the multiplier, output an internal induced voltage Ef_d of an operating point where the amplitude of the interconnection point voltage Vsys of the power grid is |V|*, the internal induced voltage Ef exists on the d-axis and also a decrease in the amplitude among the voltage drop due to the transformer is compensated;

a subtractor configured to, by subtracting the voltage drop Vz_d calculated by the Vz calculation unit from the internal induced voltage Ef_d calculated by the third adder, output an output voltage command value Vac_d* of the operating point where the amplitude of the interconnection point voltage Vsys of the power grid is |V|*, the internal induced voltage Ef exists on the d-axis and also the decrease in the amplitude among the voltage drop due to the transformer is compensated; and a polarity reverser configured to reverse a polarity of the voltage drop Vz_q calculated by the Vz calculation unit and output an output voltage command value Vac_q*, and the control of the output voltage control unit is performed on d-q coordinates obtained by performing a rotational coordinate conversion with the internal phase that is determined from the angular frequency determined by the virtual synchronous generator model.

(1) According to the inventions described in claims 1 to 9, it is possible to simulate the voltage drop caused by the virtual synchronous impedance and reproduce the synchronizing power while maintaining the amplitude of the output voltage command constant even at a time of load fluctuation.

(2) According to the inventions described in claims 3 and 7, since the output voltage command value Vac* is set as a reference phase, an amount of calculation in the virtual synchronous impedance compensation block is small.

(3) According to the inventions described in claims 5 and 9, in a case where the virtual synchronous impedance is set to such a small value that the error of the phase difference δ does not become a problem, a storage unit (e.g. a buffer) required to temporarily store the internal induced voltage Ef calculated in each control cycle like claim 4 is not necessary, thereby simplifying the configuration.

(4) According to the inventions described in claims 10 to 12, it is possible to maintain the amplitude of the system voltage (the interconnection point voltage of the power grid) Vsys at the voltage amplitude command value |V|* even at a time of load fluctuation, simulate the voltage drops caused by the virtual synchronous impedance Zs and the impedance Ztr of the interconnection transformer, then reproduce the synchronizing power.

(5) According to the inventions described in claim 11, it is possible to calculate the output voltage command value Vac* and the internal induced voltage Ef of the operating point where compensation is performed so as to cancel out the voltage drop due to the interconnection transformer.

(6) According to the inventions described in claim 12, it is possible to calculate the output voltage command value Vac* and the internal induced voltage Ef of the operating point where the decrease in the amplitude among the voltage drop due to the interconnection transformer is compensated.

EMBODIMENTS FOR CARRYING OUT THE INVENTION

Embodiments of the present invention will be described below with reference to the drawings. However, the present invention is not limited to the following embodiments.

In the present embodiment, in a PCS (power conversion system) interconnecting a DC power supply such as a storage battery to a system (a grid) through a DC/AC conversion device (a power converter INV), an LC filter and a transformer and particularly having in its control system a virtual synchronous generator model that determines an angular frequency ωr simulating a synchronous generator and a virtual synchronous impedance compensation block that simulates an internal induced voltage Ef and a voltage drop (Vz) caused by a virtual synchronous impedance (Zs) of the synchronous generator, when controlled by voltage control that controls an output voltage of the PCS to a command value, by mathematically obtaining an operating point of a voltage command value Vac* and the internal induced voltage Ef according to the voltage drop (Vz) generated by the virtual synchronous impedance (Zs) by or in the virtual synchronous impedance compensation block, a quick response can be realized even at a time of load fluctuation while reproducing a synchronizing power by the virtual synchronous impedance.

Figure 1:
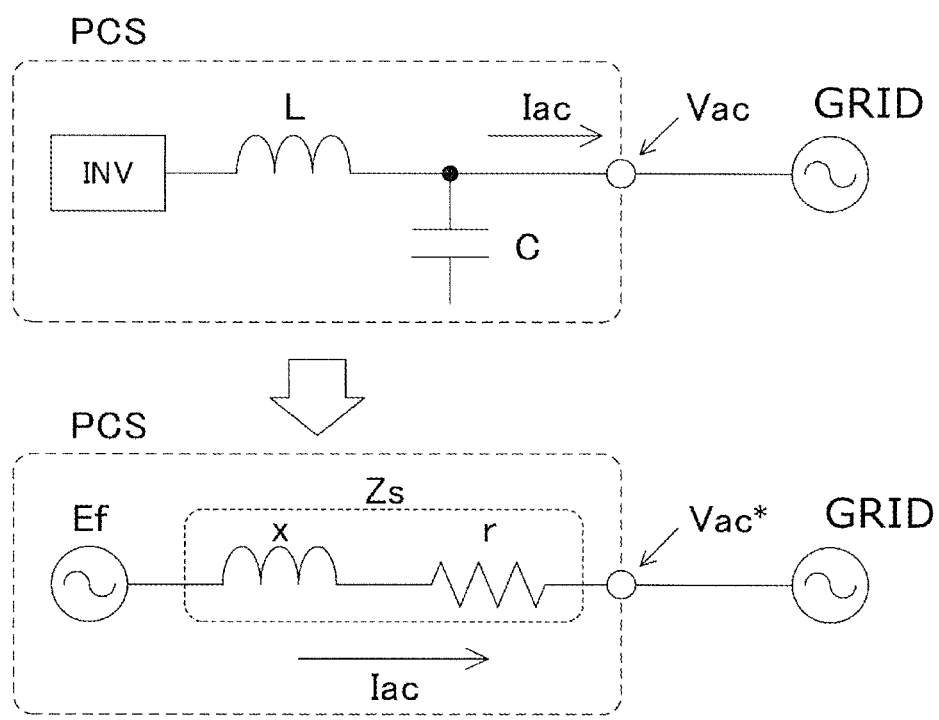
FIG. 1 is an explanatory drawing of a virtual impedance model in a power conversion device (or a power conversion system).
Figure 2:
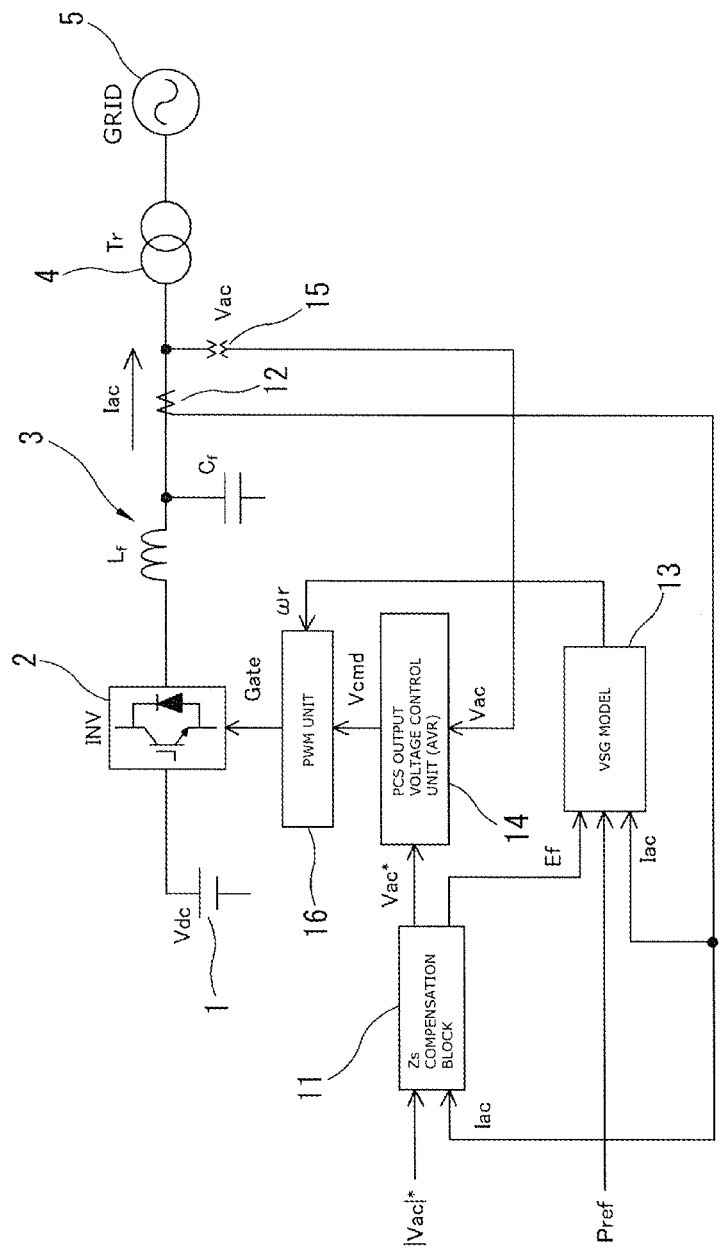
FIG. 2 is an example of a general configuration of a control system of the power conversion system (or the power conversion device) according to an embodiment of the present invention.

FIG. 2 shows an example of a general configuration of the control system of the power conversion system according to the present embodiment. In FIG. 2, a reference sign 1 is the DC power supply having, e.g. a storage battery. A reference sign 2 is the power converter (INV) that converts DC power of the DC power supply 1 into AC power.

The power converter 2 is formed by, for instance, bridge-connected IGBTs, and these IGBTs are ON/OFF-controlled by gate signals generated by an after-mentioned PWM unit 16.

An AC output side of the power converter 2 is connected (interconnected) to a power system (or a power grid) 5 through an LC filter 3 formed by a reactor Lf and a capacitor Cf and a transformer 4 (Tr).

A reference sign 11 is a virtual synchronous impedance compensation block (a Zs compensation block) that inputs an output current detection value Iac obtained by detecting an output current of the power converter 2 by a current transformer 12 and a set voltage amplitude command value |Vac|*, simulates a voltage drop Vz generated by flow of the output current of the power converter 2 to a virtual synchronous impedance Zs, and calculates an output voltage command value Vac* and an internal induced voltage Ef of a virtual synchronous generator according to the simulated voltage drop Vz.

A reference sign 13 is a virtual synchronous generator model that calculates an electric output (Pe) of the VSG (Virtual Synchronous Generator) model from the internal induced voltage Ef calculated by or in the virtual synchronous impedance compensation block 11 and the output current detection value Iac and determines an angular frequency ωr simulating a synchronous generator on the basis of a difference (a deviation) between the calculated electric output (Pe) and a set reference power Pref.

A reference sign 14 is a PCS output voltage control unit (AVR) that generates an output voltage control command Vcmd for performing control so that an output voltage Vac obtained by detecting an output voltage of the PCS (an output voltage of the power converter 2) by an instrument transformer 15 coincides with the output voltage command value Vac* calculated by or in the virtual synchronous impedance compensation block 11.

A reference sign 16 is a PWM unit that generates a gate signal Gate PWM-modulated by the output voltage control command Vcmd generated by or in the PCS output voltage control unit 14 and a PWM carrier and PWM-controls the power converter 2. In a case of synchronous PWM, a PWM carrier having a frequency obtained by multiplying by the angular frequency ωr determined by or in the virtual synchronous generator model 13 is used. In a case of asynchronous PWM, a PWM carrier having a fixed frequency is used.

Here, in FIG. 2, the output current detection value Iac and the output voltage Vac each use a signal obtained by converting three phases u, v and w into a d-axis and a q-axis by a phase obtained by integrating the angular frequency ωr. The output voltage control command Vcmd uses a signal obtained by inverse-dq-converting a d-axis and a q-axis into three phases u, v and w by a phase obtained by integrating the angular frequency ωr.

Details of the virtual synchronous impedance compensation block 11 are configured as shown in the following each embodiment.

Embodiment 1

Figure 3:
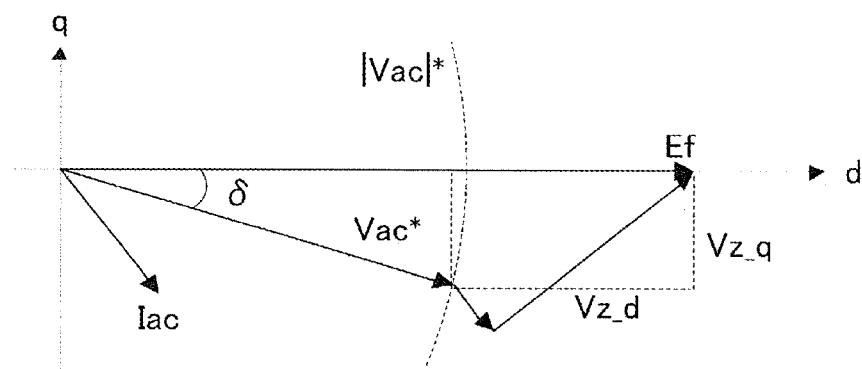
FIG. 3 is a vector diagram of a virtual synchronous impedance model according to an embodiment 1 of the present invention.

In an embodiment 1, a relationship between the output current detection value Iac, the output voltage command value Vac*, the internal induced voltage Ef, an output voltage phase δ, the voltage amplitude command value |Vac|* and voltage drops Vz_d and Vz_q on a d-axis and a q-axis is shown in FIG. 3, with the internal induced voltage Ef being set as a reference phase (on the d-axis).

The virtual synchronous impedance compensation block 11 in the embodiment 1 calculates, from the output current detection value Iac, the virtual synchronous impedance Zs and the set voltage amplitude command value |Vac|*, the output voltage command value Vac* and the internal induced voltage Ef of an operating point where an amplitude of the output voltage command value Vac* is |Vac|* and also the internal induced voltage Ef exists on the d-axis. The virtual synchronous impedance compensation block 11 is configured as shown in FIG. 4.

Figure 4:
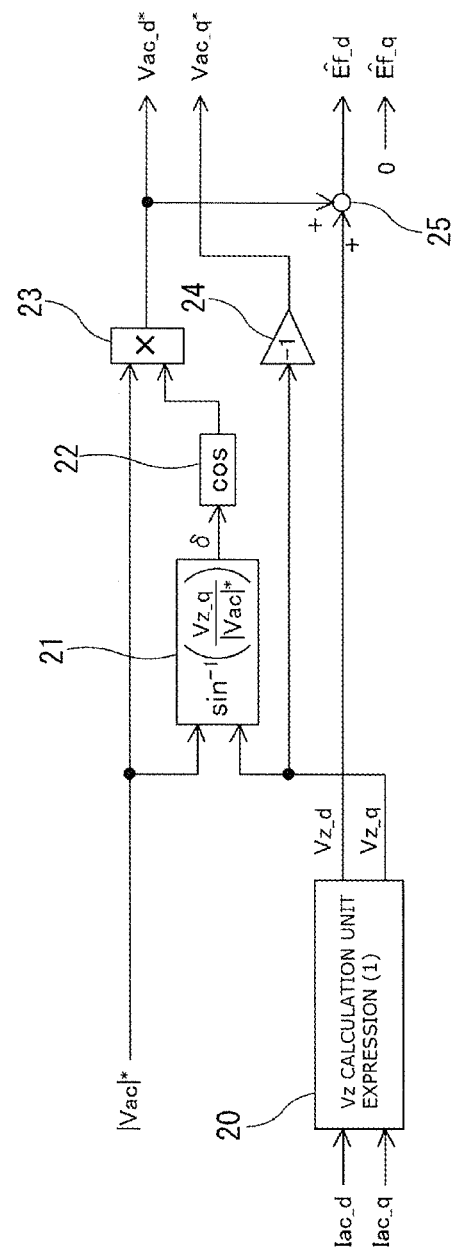
FIG. 4 is a block diagram of a virtual synchronous impedance compensation block according to the embodiment 1 of the present invention.

In FIG. 4, a reference sign 20 is a Vz calculation unit that calculates the voltage drops Vz_d and Vz_q caused by the virtual synchronous impedance Zs by calculating the following expression (1) on the basis of a d-axis current detection value Iac_d and a q-axis current detection value Iac_q each obtained by converting the output current detection value Iac into the d-axis and the q-axis.

[Expression 1]

$$\vec{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)

A reference sign 21 is a $\sin^{-1}$ calculation unit that calculates the output voltage phase δ by calculating the following expression (2) on the basis of the voltage drop Vz_q calculated by the Vz calculation unit 20 and the voltage amplitude command value |Vac|*.

[Expression 2]

$$\delta = \sin^{-1}\left(\frac{V_{Z\_q}}{|V_{ac}|^*}\right) \quad (2)$$

A reference sign 22 is a cos calculation unit that calculates a cos δ that is a cos component of the output voltage phase δ.

A reference sign 23 is a multiplier that, by multiplying the voltage amplitude command value |Vac|* by an output of the cos calculation unit 22, obtains an output voltage command value Vac_d* of an operating point where the amplitude of the output voltage command value Vac* is |Vac|* and also the internal induced voltage Ef exists on the d-axis.

A reference sign 24 is a polarity reverser that reverses a polarity of the voltage drop Vz_q calculated by the Vz calculation unit 20. An output of the polarity reverser 24 is output as an output voltage command value Vac_q*.

A reference sign 25 is an adder that, by adding the voltage drop Vz_d calculated by the Vz calculation unit 20 to the output voltage command value Vac_d* obtained by the multiplier 23, obtains an internal induced voltage Ef_d of an operating point where the amplitude of the output voltage command value Vac* is |Vac|* and also the internal induced voltage Ef exists on the d-axis. Here, an internal induced voltage Ef_q is 0.

In the system configured as above, the PCS output voltage control unit 14 performs voltage control so that the output voltage Vac (the voltage Vac obtained by detecting a terminal voltage after the LC filter) coincides with the output voltage command value Vac* obtained by subtracting the voltage drop Vz generated by f low of the output current Iac to the virtual synchronous impedance Zs from the internal induced voltage Ef.

When expressing the voltage drop Vz by the virtual synchronous impedance Zs (r and x) and the output current Iac on the d-q coordinates, it becomes the following expression (1) (an expression calculated by the Vz calculation unit 20).

[Expression 1]

$$\vec{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

From the voltage drop Vz, the operating point where the amplitude of the output voltage command value Vac* is |Vac|* and also the internal induced voltage Ef is positioned on the d-axis can be uniquely (univocally) determined, and it becomes the following expressions (2) to (4).

[Expression 2]

$$\delta = \sin^{-1}\left(\frac{V_{Z\_q}}{|V_{ac}|^*}\right) \quad (2)$$

[Expression 3]

$$\vec{V}_{ac}^* = \begin{bmatrix} V_{ac\_d}^* \\ V_{ac\_q}^* \end{bmatrix} = \begin{bmatrix} |V_{ac}|^*\cos\delta \\ -V_{Z\_q} \end{bmatrix} \quad (3)$$

[Expression 4]

$$\vec{E}_f = \begin{bmatrix} E_{f\_d} \\ E_{f\_q} \end{bmatrix} = \begin{bmatrix} |V_{ac}|^*\cos\delta + V_{Z\_d} \\ 0 \end{bmatrix} \quad (4)$$

The above expression (2) can be obtained by the $\sin^{-1}$ calculation unit 21 in FIG. 4. The above expression (3) can be obtained by the multiplier 23 and the polarity reverser 24. The above expression (4) can be obtained by the adder 25.

In this manner, by sequentially calculating the voltage command value Vac* to be output according to a load current (the output current detection value Iac) and the internal induced voltage Ef by or in the virtual synchronous impedance compensation block 11 in FIG. 4, it is possible to maintain the amplitude of the output voltage command value Vac* at the voltage amplitude command value |Vac|* even at a time of load fluctuation, also simulate the voltage drop Vz caused by the virtual synchronous impedance Zs, then reproduce the synchronizing power.

As described above, according to the embodiment 1, on the coordinates with the internal induced voltage Ef being the reference, by sequentially calculating, according to the load current, the output voltage command value Vac* and the internal induced voltage Ef of the operating point where the amplitude of the output voltage command value Vac* is the voltage amplitude command value |Vac|* and also the internal induced voltage Ef is positioned on the d-axis, it is possible to simulate the voltage drop caused by the virtual synchronous impedance and reproduce the synchronizing power while maintaining the voltage amplitude constant even at a time of load fluctuation.

Embodiment 2

Figure 5:
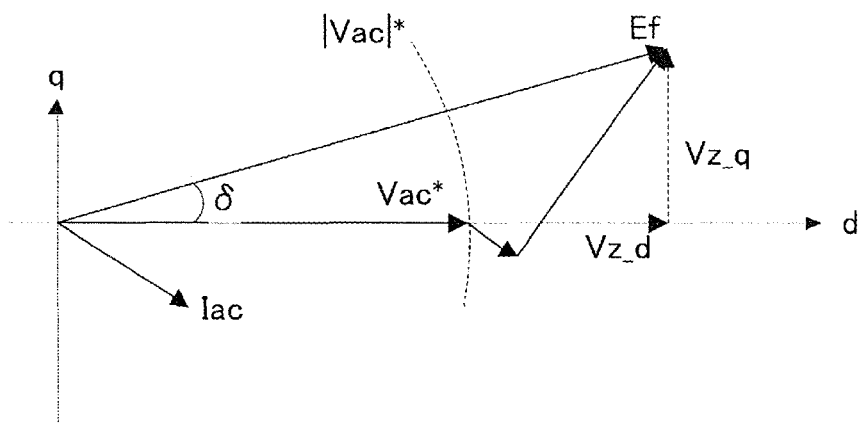
FIG. 5 is a vector diagram of a virtual synchronous impedance model according to an embodiment 2 of the present invention.

In an embodiment 2, a relationship between the output current detection value Iac, the output voltage command value Vac*, the internal induced voltage Ef, the output voltage phase δ, the voltage amplitude command value |Vac|* and the voltage drops Vz_d and Vz_q on the d-axis and the q-axis is shown in FIG. 5, with the output voltage command value Vac* being set as the reference phase (on the d-axis).

The virtual synchronous impedance compensation block 11 in the embodiment 2 calculates, from the output current detection value Iac, the virtual synchronous impedance Zs and the set voltage amplitude command value |Vac|*, the output voltage command value Vac* and the internal induced voltage Ef of an operating point where the amplitude of the output voltage command value Vac* is |Vac|* and also the output voltage command value Vac* exists on the d-axis. The virtual synchronous impedance compensation block 11 is configured as shown in FIG. 6.

Figure 6:
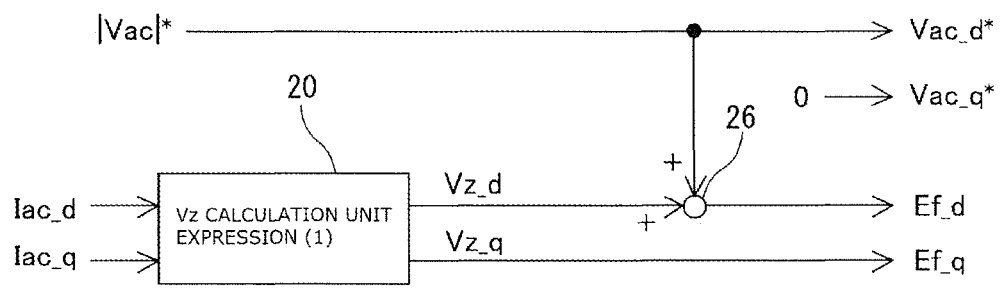
FIG. 6 is a block diagram of a virtual synchronous impedance compensation block according to the embodiment 2 of the present invention.

In FIG. 6, the same elements are denoted by the same reference signs as those of FIG. 4. A reference sign 26 is an adder that, by adding the voltage drop Vz_d calculated by the Vz calculation unit 20 to the voltage amplitude command value |Vac|*, obtains the internal induced voltage Ef_d of an operating point where the amplitude of the output voltage command value Vac* is |Vac|* and also the output voltage command value Vac* exists on the d-axis.

The voltage drop Vz_q calculated by the Vz calculation unit 20 is output as the internal induced voltage Ef_q.

Since the output voltage command value Vac* is set on the d-axis, |Vac|* is output as Vac_d*, and the q-axis component Vac_q* is 0.

In the above embodiment 1, the reference phase is the internal induced voltage Ef. However, in the present embodiment 2, as shown in FIG. 5, the embodiment 2 is considered with the reference phase being the output voltage command value Vac*. In the same way as the embodiment 1, the voltage drop Vz caused by the virtual synchronous impedance Zs is obtained from the expression (1).

From the voltage drop Vz, the operating point where the amplitude of the output voltage command value Vac* is |Vac|* and also the output voltage command value Vac* is positioned on the d-axis can be uniquely (univocally) determined, and it becomes the following expressions (5) and (6).

[Expression 5]

$$\vec{V}_{ac}^* = \begin{bmatrix} V_{ac\_d}^* \\ V_{ac\_q}^* \end{bmatrix} = \begin{bmatrix} |V_{ac}|^* \\ 0 \end{bmatrix} \quad (5)$$

[Expression 6]

$$\vec{E}_f = \begin{bmatrix} E_{f\_d} \\ E_{f\_q} \end{bmatrix} = \begin{bmatrix} |V_{ac}|^* + V_{Z\_d} \\ V_{Z\_q} \end{bmatrix} \quad (6)$$

Vac_d* and Vac_q* in the expression (5) are output from the virtual synchronous impedance compensation block 11 in FIGS. 2 and 6, and the expression (6) can be obtained by the adder 26 in FIG. 6.

As described above, according to the embodiment 2, in the same manner as the embodiment 1, it is possible to maintain the amplitude of the output voltage command value Vac* at the voltage amplitude command value |Vac|* even at a time of load fluctuation, also simulate the voltage drop Vz caused by the virtual synchronous impedance Zs, then reproduce the synchronizing power.

Here, in the embodiment 2, since calculation of trigonometric function is not needed, an amount of calculation is smaller than that in the embodiment 1.

Embodiment 3

In an embodiment 3, a relationship between the output current detection value Iac, the output voltage command value Vac*, the internal induced voltage Ef, the output voltage phase δ, the voltage amplitude command value |Vac|* and the voltage drops Vz_d and Vz_q on the d-axis and the q-axis is shown in FIG. 7, with the internal induced voltage Ef being set as the reference phase (on the d-axis).

Figure 7A:
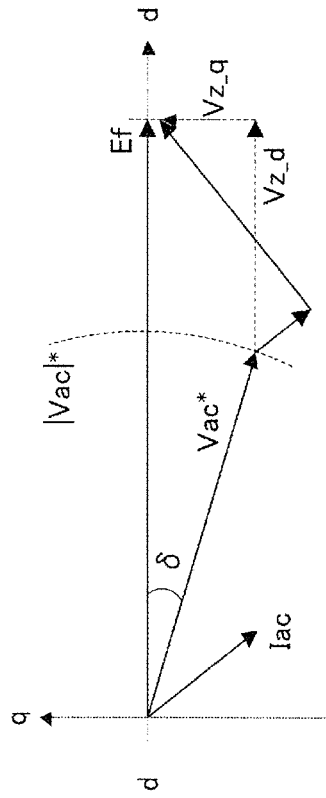
FIGS. 7A and 7B are vector diagrams of a virtual synchronous impedance model according to an embodiment 3 of the present invention.
Figure 7B:
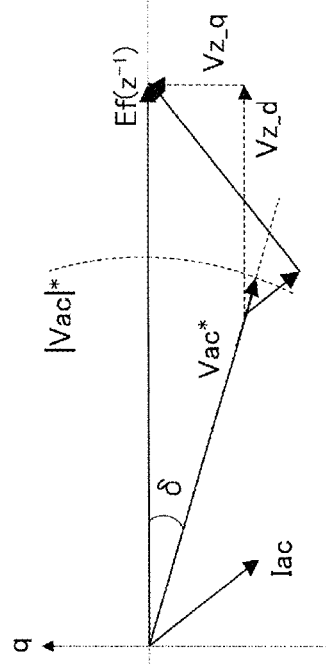

Here, when calculating the output voltage command value Vac*, as shown in FIG. 7A, an internal induced voltage Ef ($Z^{-1}$) obtained in a previous control cycle is set on the d-axis, and when calculating the internal induced voltage Ef, as shown in FIG. 7B, an internal induced voltage Ef in the present control cycle is set on the d-axis.

The virtual synchronous impedance compensation block 11 in the embodiment 3 calculates a phase difference δ from the output current detection value Iac, the virtual synchronous impedance Zs and the internal induced voltage calculated in the previous control cycle, and calculates the output voltage command value Vac* by performing a rotational coordinate conversion of the set voltage amplitude command value |Vac|* with the phase difference δ, then calculates the internal induced voltage Ef from the calculated output voltage command value Vac*, the output current detection value Iac and the virtual synchronous impedance Zs. The virtual synchronous impedance compensation block 11 is configured as shown in FIG. 8.

Figure 8:
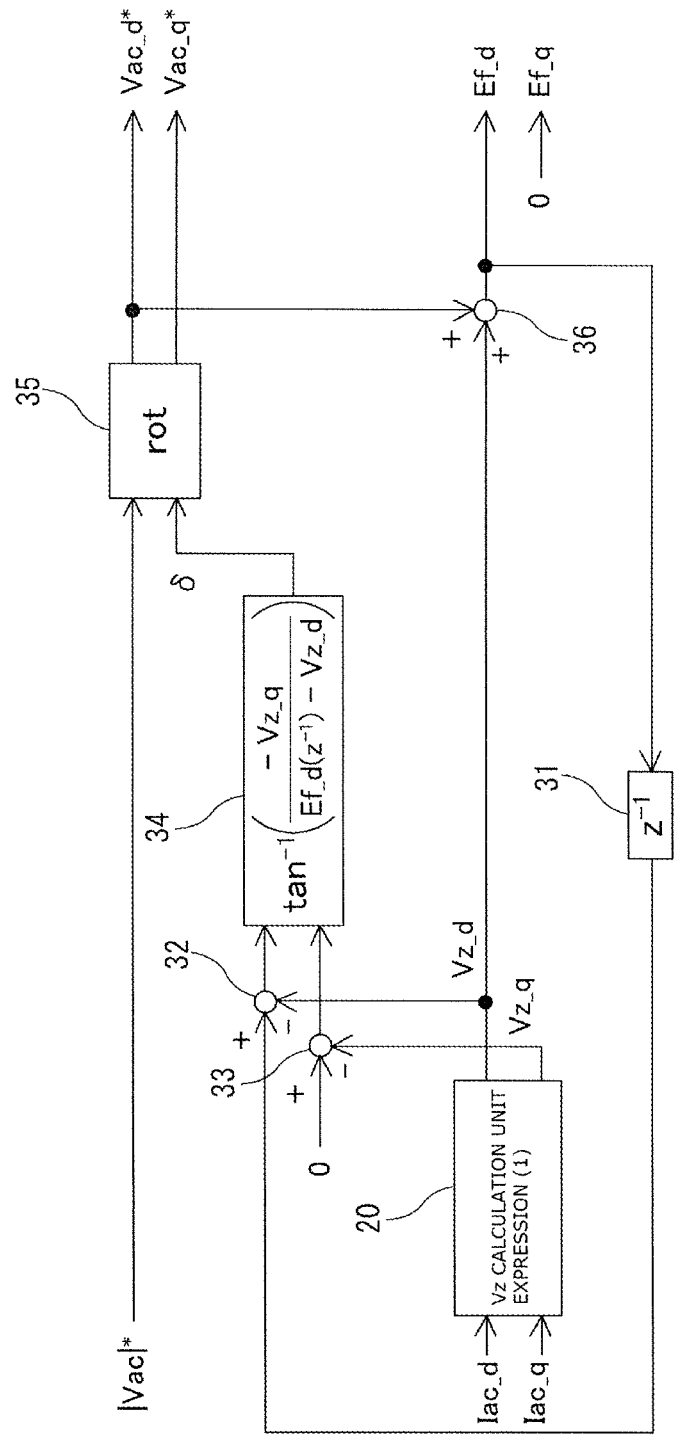
FIG. 8 is a block diagram of a virtual synchronous impedance compensation block according to the embodiment 3 of the present invention.

In FIG. 8, the same elements are denoted by the same reference signs as those of FIG. 4. In FIG. 8, a reference sign 31 is a buffer ($Z^{-1}$ is a unit delay operator) that temporarily stores the internal induced voltage Ef_d calculated by an after-mentioned adder 36 in each control cycle.

A reference sign 32 is a subtractor that obtains a difference (a deviation) between an internal induced voltage Ef_d ($Z^{-1}$)

calculated in the previous control cycle and stored in the buffer 31 and the voltage drop Vz_d calculated by the Vz calculation unit 20.

A reference sign 33 is a subtractor that obtains a difference (a deviation) between a set 0 and the voltage drop Vz_q calculated by the Vz calculation unit 20.

A reference sign 34 is a $\tan^{-1}$ calculation unit that obtains the phase difference δ by calculating the following expression (7) on the basis of a difference output (a deviation output) (Ef_d ($Z^{-1}$)–Vz_d) of the subtractor 32 and a difference output (a deviation output) (–Vz_q) of the subtractor 33.

[Expression 7]

$$\delta = \tan^{-1}\left(\frac{-V_{z\_q}}{E_f(z^{-1}) - V_{z\_d}}\right) \quad (7)$$

A reference sign 35 is a rotational matrix operation unit that calculates the output voltage command values Vac_d* and Vac_q* by performing the rotational coordinate conversion of the voltage amplitude command value |Vac|* with the phase difference δ obtained by the $\tan^{-1}$ calculation unit 34 along the following expression (8).

[Expression 8]

$$V'_{ac} = \begin{bmatrix} V^*_{ac\_d} \\ V^*_{ac\_q} \end{bmatrix} = \begin{bmatrix} \cos\delta & -\sin\delta \\ \sin\delta & \cos\delta \end{bmatrix}\begin{bmatrix} |V_{ac}|^* \\ 0 \end{bmatrix} = \begin{bmatrix} |V_{ac}|^*\cos\delta \\ |V_{ac}|^*\sin\delta \end{bmatrix} \quad (8)$$

A reference sign 36 is an adder that calculates the internal induced voltage Ef_d by adding the voltage drop Vz_d calculated by the Vz calculation unit 20 to the output voltage command value Vac_d* calculated by the rotational matrix operation unit 35.

Ef_d that is an addition output of the adder 36 is output and stored in the buffer 31 for calculation in the next control cycle. Here, the internal induced voltage Ef_q approximates to 0.

In the above embodiment 1, the internal induced voltage Ef and the output voltage command value Vac* are obtained at the same time. However, in the present embodiment 3, as shown in the circuit of FIG. 8, the phase difference δ is obtained, as indicated in the following expression (7), by the $\tan^{-1}$ calculation unit 34 from the difference between the internal induced voltage previous value Ef ($Z^{-1}$) obtained in the previous control cycle and the voltage drop Vz, and the rotational coordinate conversion of the voltage amplitude command value |Vac|* with the phase difference δ is performed, as indicated in the following expression (8), by the rotational matrix operation unit 35, then the output voltage command value Vac* is obtained.

[Expression 7]

$$\delta = \tan^{-1}\left(\frac{-V_{z\_q}}{E_f(z^{-1}) - V_{z\_d}}\right) \quad (7)$$

[Expression 8]

$$V'_{ac} = \begin{bmatrix} V^*_{ac\_d} \\ V^*_{ac\_q} \end{bmatrix} = \begin{bmatrix} \cos\delta & -\sin\delta \\ \sin\delta & \cos\delta \end{bmatrix}\begin{bmatrix} |V_{ac}|^* \\ 0 \end{bmatrix} = \begin{bmatrix} |V_{ac}|^*\cos\delta \\ |V_{ac}|^*\sin\delta \end{bmatrix} \quad (8)$$

The internal induced voltage Ef is indicated by the following expression (9) from the output voltage command value Vac* and the voltage drop Vz.

[Expression 9]

$$\dot{E}_f = \begin{bmatrix} E_{f\_d} \\ E_{f\_q} \end{bmatrix} = \begin{bmatrix} V^*_{ac\_d} + V_{z\_d} \\ V^*_{ac\_q} + V_{z\_q} \end{bmatrix} \cong \begin{bmatrix} V^*_{ac\_d} + V_{z\_d} \\ 0 \end{bmatrix} \quad (9)$$

The above expression (9) is calculated by the adder 36.

In the embodiment 3, since the operating point is determined with the internal induced voltage previous value Ef ($Z^{-1}$) being the reference, a q-axis component may appear in the internal induced voltage Ef. However, since the internal induced voltage Ef is set on the d-axis, the q-axis component approximates to 0. Further, Ef_d is stored in the buffer 31 for calculation in the next control cycle. Here, an initial value of the buffer 31 is set to the voltage amplitude command value |Vac|*.

As described above, according to the embodiment 3, by calculating the output voltage command value Vac* using the internal induced voltage previous value Ef ($Z^{-1}$) of the previous control cycle, it is possible to simulate the voltage drop Vz caused by the virtual synchronous impedance Zs and reproduce the synchronizing power while maintaining the voltage amplitude constant. Because the internal induced voltage previous value Ef ($Z^{-1}$) of the previous control cycle is used, a response is slow as compared with the embodiments 1 and 2. Further, the internal induced voltage Ef is an approximate value.

Embodiment 4

Figure 9A:
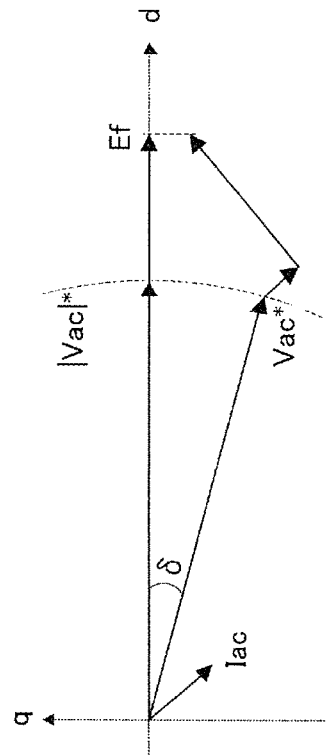
FIGS. 9A and 9B are vector diagrams of a virtual synchronous impedance model according to an embodiment 4 of the present invention.
Figure 9B:
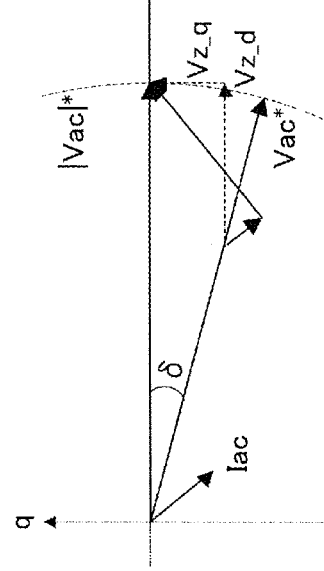

In an embodiment 4, a relationship between the output current detection value Iac, the output voltage command value Vac*, the internal induced voltage Ef, the output voltage phase δ, the voltage amplitude command value |Vac|* and the voltage drops Vz_d and Vz_q on the d-axis and the q-axis is shown in FIG. 9, with the internal induced voltage Ef being set as the reference phase (on the d-axis). Here, when calculating the output voltage command value Vac*, vectors are shown in FIG. 9A, and when calculating the internal induced voltage Ef, vectors are shown in FIG. 9B.

The virtual synchronous impedance compensation block 11 in the embodiment 4 calculates the phase difference δ from the output current detection value Iac, the virtual synchronous impedance Zs and the set voltage amplitude command value |Vac|*, and calculates the output voltage command value Vac* by performing a rotational coordinate conversion of the set voltage amplitude command value |Vac|* with the phase difference δ, then calculates the internal induced voltage Ef from the calculated output voltage command value Vac*, the output current detection value Iac and the virtual synchronous impedance Zs. The virtual synchronous impedance compensation block 11 is configured as shown in FIG. 10.

Figure 10:
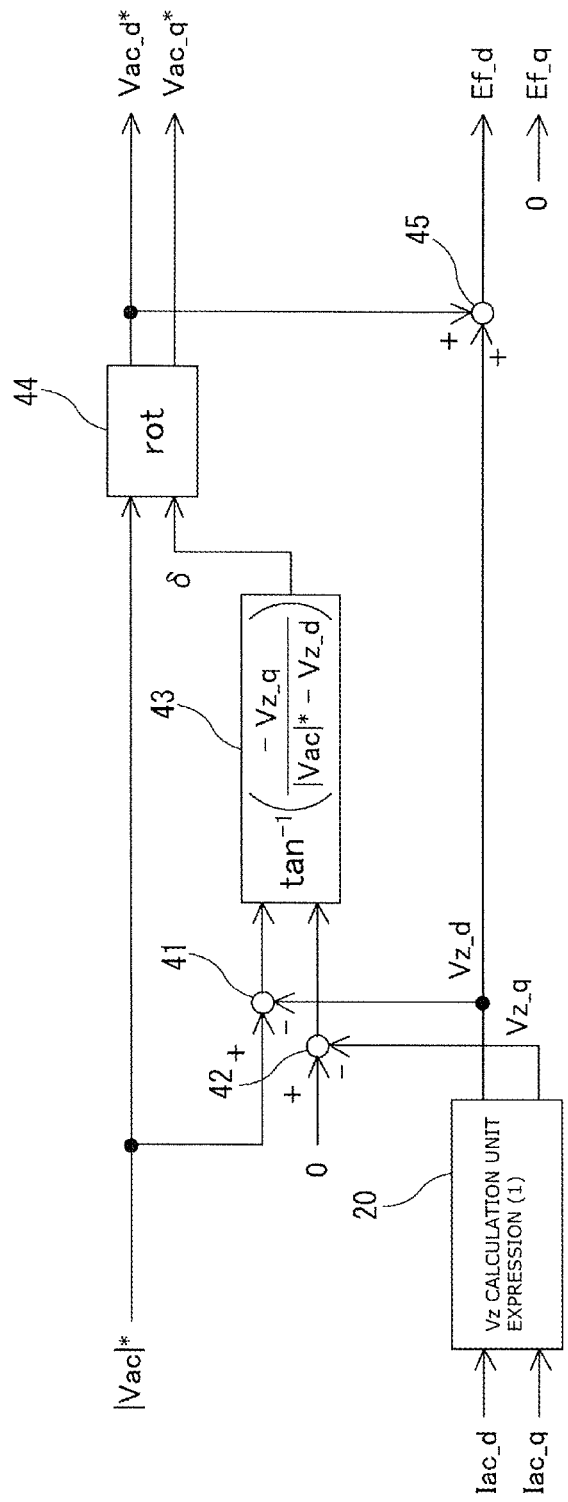
FIG. 10 is a block diagram of a virtual synchronous impedance compensation block according to the embodiment 4 of the present invention.

In FIG. 10, the same elements are denoted by the same reference signs as those of FIG. 8. In FIG. 10, a reference sign 41 is a subtractor that obtains a difference (a deviation) between the voltage amplitude command value |Vac|* and the voltage drop Vz_d calculated by the Vz calculation unit 20.

A reference sign 42 is a subtractor that obtains a difference (a deviation) between a set 0 and the voltage drop Vz_q calculated by the Vz calculation unit 20.

A reference sign 43 is a $\tan^{-1}$ calculation unit that obtains the phase difference δ by calculating the following expression (10) on the basis of a difference output (a deviation output) (|Vac|*−Vz_d) of the subtractor 41 and a difference output (a deviation output) (−Vz_q) of the subtractor 42.

[Expression 10]

$$\delta = \tan^{-1}\left(\frac{-V_{z\_q}}{|V_{ac}|^* - V_{z\_d}}\right) \quad (10)$$

A reference sign 44 is a rotational matrix operation unit that calculates the output voltage command values Vac_d* and Vac_q* by performing the rotational coordinate conversion of the voltage amplitude command value |Vac|* with the phase difference δ obtained by the $\tan^{-1}$ calculation unit 43 along the following expression (8).

[Expression 8]

$$V'_{ac} = \begin{bmatrix} V^*_{ac\_d} \\ V^*_{ac\_q} \end{bmatrix} = \begin{bmatrix} \cos\delta & -\sin\delta \\ \sin\delta & \cos\delta \end{bmatrix} \begin{bmatrix} |V_{ac}|^* \\ 0 \end{bmatrix} = \begin{bmatrix} |V_{ac}|^*\cos\delta \\ |V_{ac}|^*\sin\delta \end{bmatrix} \quad (8)$$

A reference sign 45 is an adder that calculates the internal induced voltage Ef_d by adding the voltage drop Vz_d calculated by the Vz calculation unit 20 to the output voltage command value Vac_d* calculated by the rotational matrix operation unit 44. Here, the internal induced voltage Ef_q approximates to 0.

In the above embodiment 3, the previous value of the internal induced voltage Ef is used for the calculation of the phase difference δ. However, in the present embodiment 4, the voltage amplitude command value |Vac|* is used for simplification.

That is, the following expression (10) is calculated by the subtractors 41 and 42 and the $\tan^{-1}$ calculation unit 43, then the phase difference δ is calculated.

[Expression 10]

$$\delta = \tan^{-1}\left(\frac{-V_{z\_q}}{|V_{ac}|^* - V_{z\_d}}\right) \quad (10)$$

The output voltage command values Vac_d* and Vac_q* can be obtained by calculating the expression (8) by the rotational matrix operation unit 44 in the same manner as the embodiment 3.

The internal induced voltage Ef_d can be obtained by calculating the expression (9) by the adder 45 in the same manner as the embodiment 3.

Although the phase difference δ has an error as compared with a case, like the embodiment 3, where the phase difference δ is determined by the voltage drop from the internal induced voltage Ef, it is possible to reproduce the synchronizing power while maintaining the voltage amplitude constant.

As compared with the embodiment 3, the present embodiment 4 does not require the buffer 31 for the internal induced voltage Ef, thereby simplifying the configuration.

It is noted that since the virtual synchronous impedance of the simulated synchronous generator is a parameter in the power converter, it can be freely set without being bound by physical limitations of the synchronous generator. Since it is conceivable that the smaller the virtual synchronous impedance is, the smaller the error of the phase difference δ is, in a case where the virtual synchronous impedance is set to such a small value that the error of the phase difference δ does not become a problem, the manner of the present embodiment 4 can be applied.

Embodiment 5

Figure 11:
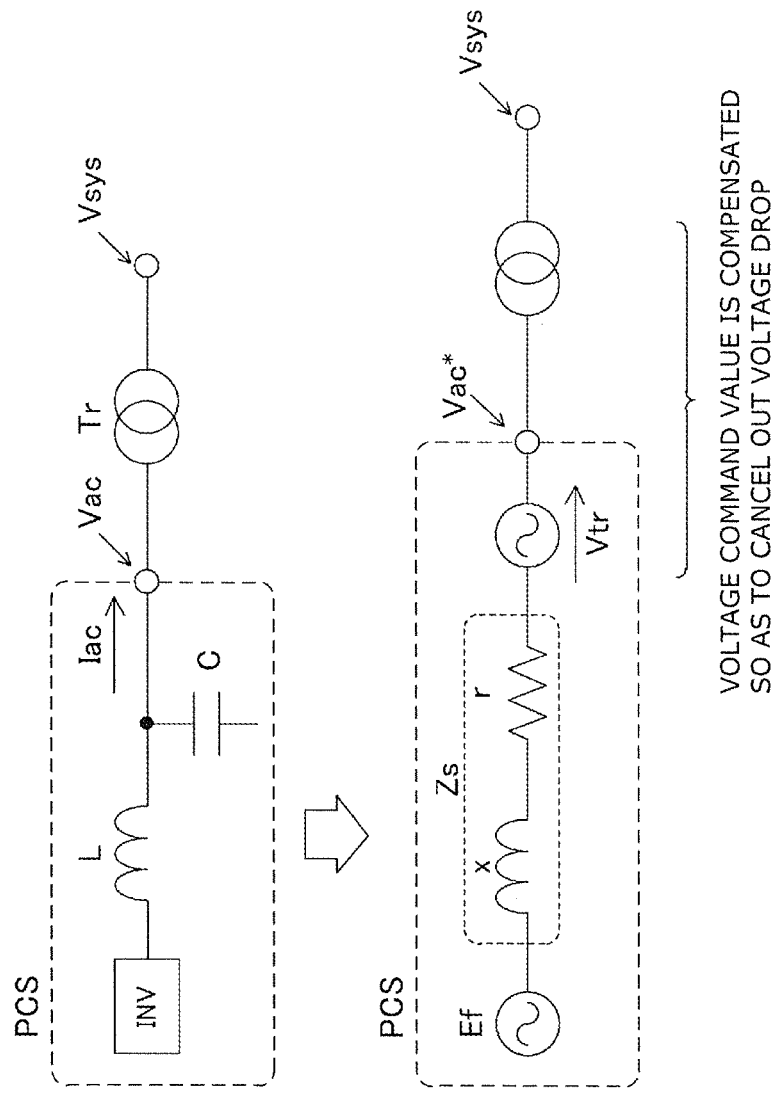
FIG. 11 is an explanatory drawing of a virtual impedance model in a power conversion device (or a power conversion system) interconnected to a power system (a power grid) through a transformer, according to an embodiment 5 of the present invention.

FIG. 11 shows, at an upper side thereof, a configuration of a PCS in which an output of a power converter that converts DC power of a DC power supply such as a storage battery into AC power is interconnected to a power system (a power grid) through an LC filter and an interconnection transformer (Tr). FIG. 11 also shows, at a lower side thereof, a configuration of a virtual synchronous impedance model.

As shown in FIG. 11, when the output of the power converter is interconnected to the power system (the power grid) through the LC filter and the interconnection transformer Tr, a system voltage (voltage at an interconnection point with the power system (the power grid)) Vsys is decreased due to a voltage drop Vtr by the transformer Tr.

When attempting to make a system voltage amplitude |Vsys| coincide with a voltage amplitude command value |V|*, control that makes the system voltage amplitude |Vsys| coincide with the voltage amplitude command value |V|* according to a voltage drop amount is necessary, and a control system that can quickly respond even at a time of load fluctuation is desirable.

Therefore, in an embodiment 5, in a PCS (power conversion system) interconnecting a DC power supply such as a storage battery to a system (a grid) through a DC/AC conversion device (a power converter INV), an LC filter and a transformer and particularly having in its control system a virtual synchronous generator model that determines an angular frequency (or simulating a synchronous generator and a virtual synchronous impedance compensation block that simulates an internal induced voltage Ef and a voltage drop (Vz) caused by a virtual synchronous impedance (Zs) of the synchronous generator, when controlled by voltage control that controls an output voltage of the PCS to a command value, by mathematically obtaining an operating point of a voltage command value Vac* and the internal induced voltage Ef according to an amount of the voltage drops generated by the virtual synchronous impedance and the transformer by or in the virtual synchronous impedance compensation block, the voltage drop due to the interconnection transformer can be compensated, and a quick response can be realized even at a time of load fluctuation while reproducing a synchronizing power by the virtual synchronous impedance.

Figure 12:
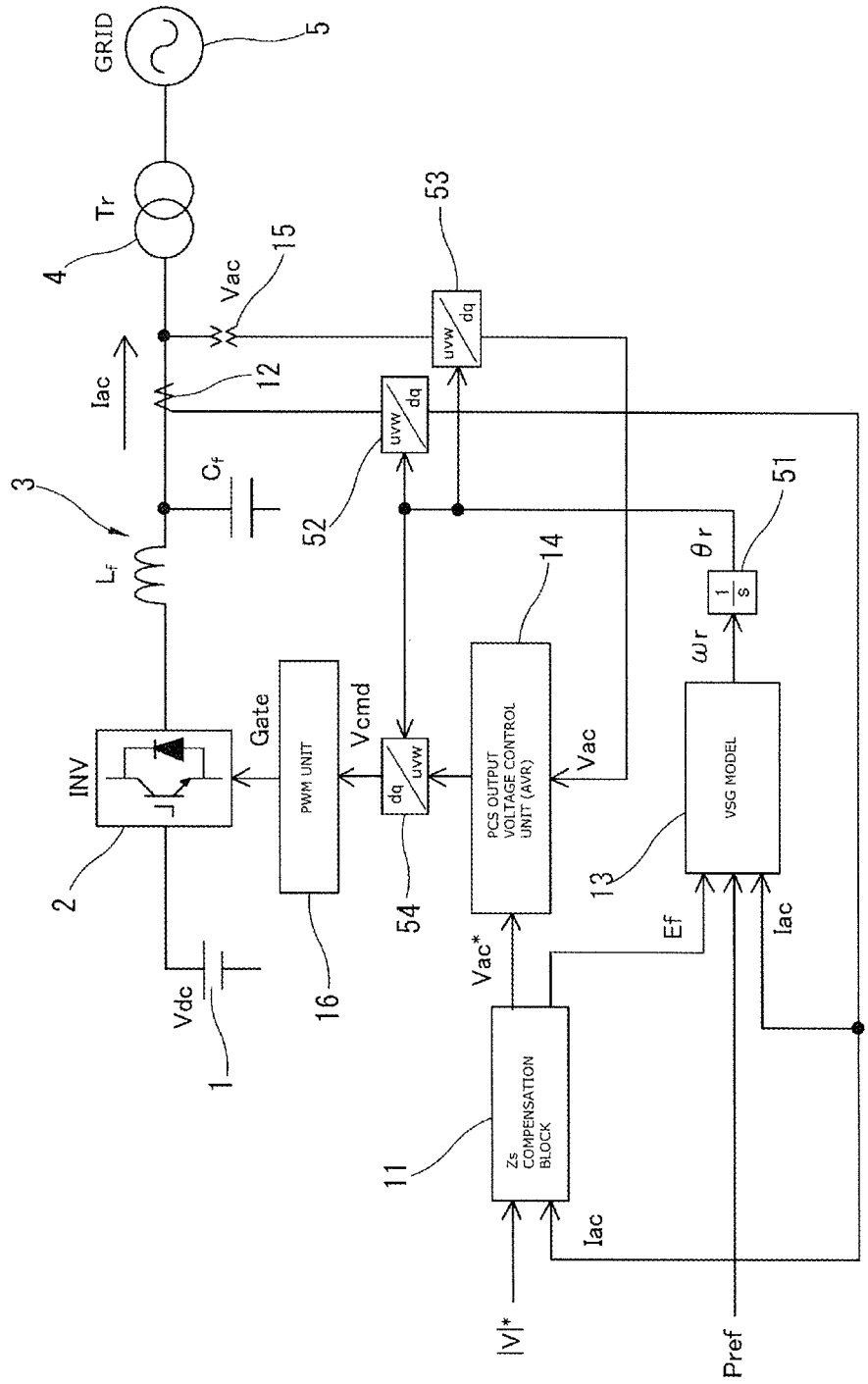
FIG. 12 is the other example of a general configuration of a control system of the power conversion system (or the power conversion device) according to the embodiment of the present invention.

FIG. 12 shows a general configuration of the control system of the power conversion system according to the embodiment 5. The same elements are denoted by the same reference signs as those of FIG. 2. In FIG. 12, a reference sign 1 is the DC power supply having, e.g. a storage battery. A reference sign 2 is the power converter (INV) that converts DC power of the DC power supply 1 into AC power.

The power converter 2 is formed by, for instance, bridge-connected IGBTs, and these IGBTs are ON/OFF-controlled by gate signals generated by an after-mentioned PWM unit 16.

An AC output side of the power converter 2 is connected (interconnected) to a power system (or a power grid) 5 through an LC filter 3 formed by a reactor Lf and a capacitor Cf and a transformer 4 (Tr).

A reference sign 11 is a virtual synchronous impedance compensation block (a Zs compensation block) that inputs an output current detection value Iac obtained by converting a detection current, which is obtained by detecting an output current of the power converter 2 by a current transformer 12, into a d-axis and a q-axis by an after-mentioned coordinate conversion unit 52 and a set voltage amplitude command value |V|*, simulates a voltage drop Vz generated by flow of the output current of the power converter 2 to a virtual synchronous impedance Zs, and calculates an output voltage command value Vac* and an internal induced voltage Ef of a virtual synchronous generator according to the simulated voltage drop Vz.

A reference sign 13 is a virtual synchronous generator model that calculates an electric output (Pe) of the VSG (Virtual Synchronous Generator) model from the internal induced voltage Ef calculated by or in the virtual synchronous impedance compensation block 11 and the output current detection value Iac and determines an angular frequency ωr simulating a synchronous generator on the basis of a difference (a deviation) between the calculated electric output (Pe) and a set reference power Pref.

A reference sign 14 is a PCS output voltage control unit (AVR) that generates a command signal for performing control so that an output voltage detection value Vac obtained by converting a detection voltage, which is obtained by detecting an output voltage of the PCS (an output voltage of the power converter 2) by an instrument transformer 15, into a d-axis and a q-axis by an after-mentioned coordinate conversion unit 53 coincides with the output voltage command value Vac* calculated by or in the virtual synchronous impedance compensation block 11. The command signal is converted into three phases u, v and w by an after-mentioned coordinate conversion unit 54, and a three-phase output voltage control command Vcmd is output.

A reference sign 16 is a PWM unit that generates a gate signal Gate PWM-modulated by the output voltage control command Vcmd generated by or in the PCS output voltage control unit 14 and a PWM carrier and PWM-controls the power converter 2. In a case of synchronous PWM, a PWM carrier having a frequency obtained by multiplying by the angular frequency ωr determined by or in the virtual synchronous generator model 13 is used. In a case of asynchronous PWM, a PWM carrier having a fixed frequency is used.

A reference sign 51 is an integrator that integrates the angular frequency ωr output from the virtual synchronous generator model 13 and outputs an internal phase θr.

The coordinate conversion units 52, 53 and 54 each perform rotational coordinate conversion with the internal phase θr output from the integrator 51.

Figure 13:
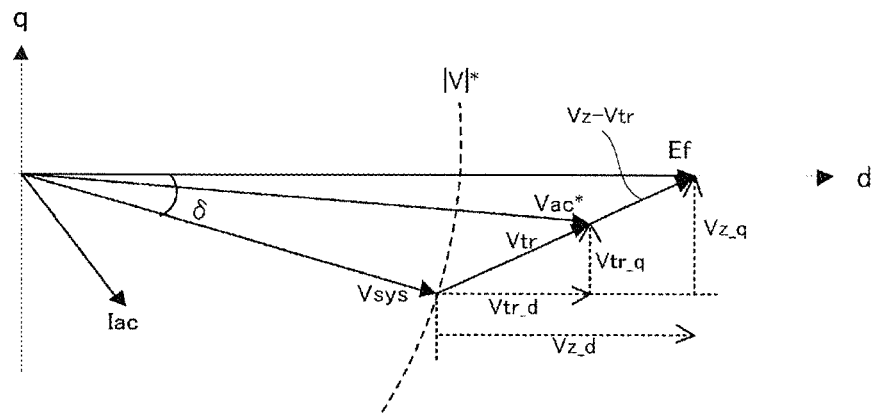
FIG. 13 is a vector diagram of a virtual synchronous impedance model according to the embodiment 5 of the present invention.

The virtual impedance model according to the embodiment 5 is shown in FIG. 11. In the embodiment 5, a relationship between the output current detection value Iac, the output voltage command value Vac*, the internal induced voltage Ef, the output voltage phase δ, the voltage amplitude command value |V|*, voltage drops Vz_d and Vz_q at the virtual synchronous impedance Zs, the system voltage (the interconnection point voltage) Vsys and voltage drops Vtr_d and Vtr_q due to the interconnection transformer 4 on the d-axis and the q-axis is shown in FIG. 13, with the internal induced voltage Ef being set as a reference phase (on the d-axis).

Figure 14:
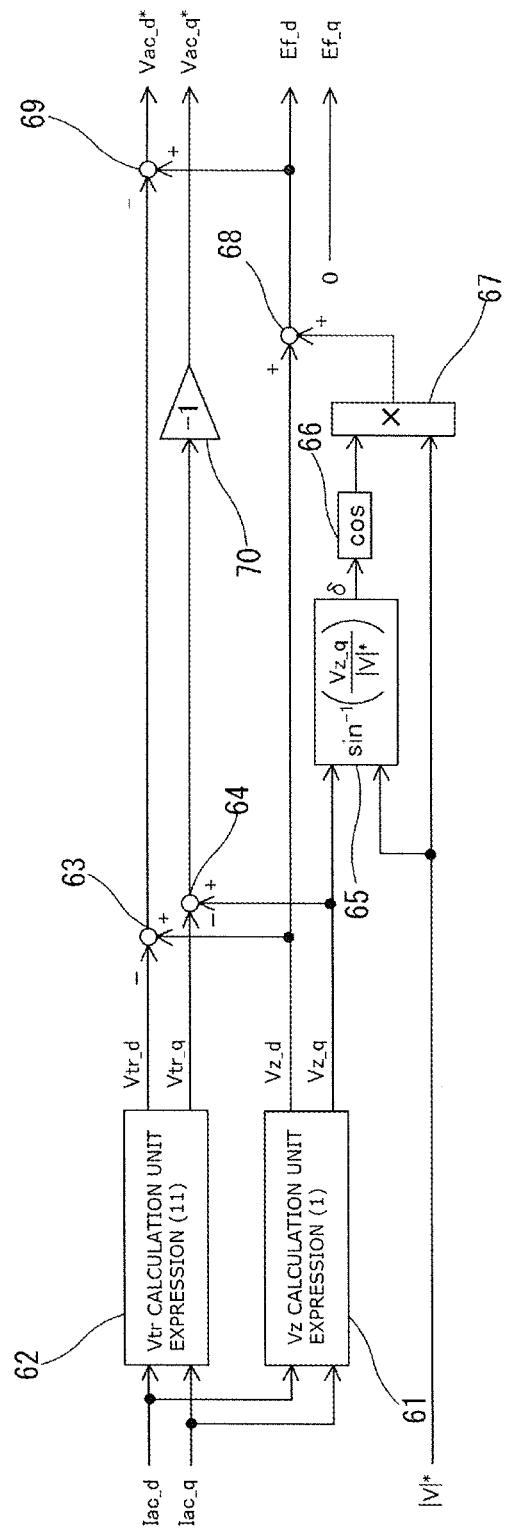
FIG. 14 is a block diagram of a virtual synchronous impedance compensation block according to the embodiment 5 of the present invention.

The virtual synchronous impedance compensation block 11 in the embodiment 5 is configured as shown in FIG. 14.

In FIG. 14, a reference sign 61 is a Vz calculation unit that calculates the voltage drops Vz_d and Vz_q caused by the virtual synchronous impedance Zs by calculating the following expression (1) on the basis of a d-axis current detection value Iac_d and a q-axis current detection value Iac_q each obtained by converting the output current detection value Iac into the d-axis and the q-axis.

[Expression 1]

$$\dot{V}_Z = \begin{bmatrix} V_{z\_d} \\ V_{z\_q} \end{bmatrix} = \begin{bmatrix} r & -x \\ x & r \end{bmatrix} \begin{bmatrix} I_{ac\_d} \\ I_{ac\_q} \end{bmatrix} \qquad (1)$$

(Here, r is a resistance component of Zs, and x is a reactance component of Zs)

A reference sign 62 is a Vtr calculation unit that calculates the voltage drops Vtr_d and Vtr_q caused by an impedance Ztr of the interconnection transformer 4 by calculating the following expression (11) on the basis of the d-axis current detection value Iac_d and the q-axis current detection value Iac_q.

[Expression 11]

$$\dot{V}_{tr} = \begin{bmatrix} V_{tr\_d} \\ V_{tr\_q} \end{bmatrix} = \begin{bmatrix} Rtr & -Xtr \\ Xtr & Rtr \end{bmatrix} \begin{bmatrix} I_{ac\_d} \\ I_{ac\_q} \end{bmatrix} \qquad (11)$$

(Here, Rtr is a resistance component of Ztr, and Xtr is a reactance component of Ztr)

A reference sign 63 is a subtractor (a first subtractor) that subtracts the voltage drop Vtr_d calculated by the Vtr calculation unit 62 from the voltage drop Vz_d calculated by the Vz calculation unit 61.

A reference sign 64 is a subtractor (a third subtractor) that subtracts the voltage drop Vtr_q calculated by the Vtr calculation unit 62 from the voltage drop Vz_q calculated by the Vz calculation unit 61.

A reference sign 65 is a $\sin^{-1}$ calculation unit that calculates the output voltage phase δ by calculating the following expression (12) on the basis of the voltage drop Vz_q calculated by the Vz calculation unit 61 and the set voltage amplitude command value |V|*.

[Expression 12]

$$\delta = \sin^{-1}\left(\frac{V_{z\_q}}{|V|^*}\right) \qquad (12)$$

A reference sign 66 is a cos calculation unit that calculates a cos δ that is a cos component of the output voltage phase δ.

A reference sign 67 is a multiplier that multiplies the voltage amplitude command value |V|* by an output of the cos calculation unit 66.

A reference sign 68 is an adder that, by adding the voltage drop Vz_d calculated by the Vz calculation unit 61 to an output of the multiplier 67, outputs an internal induced voltage Ef_d of an operating point where the amplitude of the system voltage (the interconnection point voltage of the power system (the power grid)) Vsys is |V|*, the internal induced voltage Ef exists on the d-axis and also compensation is performed so as to cancel out the voltage drop Vtr due to the transformer 4.

A reference sign 69 is a subtractor (a second subtractor) that, by subtracting a difference output (a deviation output) of the subtractor 63 from the internal induced voltage Ef_d output from the adder 68, outputs an output voltage command value Vac_d* of an operating point where the amplitude of the system voltage (the interconnection point voltage of the power system (the power grid)) Vsys is |V|*, the internal induced voltage Ef exists on the d-axis and also compensation is performed so as to cancel out the voltage drop Vtr due to the transformer 4.

A reference sign 70 is a polarity reverser that reverses a polarity of a difference output (a deviation output) of the subtractor 64. An output of the polarity reverser 70 is output as an output voltage command value Vac_q*. Here, an internal induced voltage Ef_q is 0.

It is noted that a vector "Vz-Vtr" in FIG. 13 represents a subtraction operation of the subtractor (the first subtractor) 63 in FIG. 14, and vectors "Ef", "Vz-Vtr" and "Vac*" in FIG. 13 represent a subtraction operation of the subtractor (the second subtractor) 69 in FIG. 14.

In the system configured as above, the PCS output voltage control unit 14 performs voltage control so that the output voltage Vac (the voltage Vac obtained by detecting a terminal voltage after the LC filter) coincides with the output voltage command value Vac* obtained by adding the voltage drop generated at the interconnection transformer 4 to a value obtained by subtracting the voltage drop Vz generated by flow of the output current Iac to the virtual synchronous impedance Zs from the internal induced voltage Ef.

When expressing the voltage drop Vz by the virtual synchronous impedance Zs (r and x) and the output current Iac on the d-q coordinates, it becomes the following expression (1) (an expression calculated by the Vz calculation unit 61).

[Expression 1]

$$\dot{V}_Z = \begin{bmatrix} V_{z\_d} \\ V_{z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

When expressing the voltage drop Vtr estimated by the impedance Ztr (Rtr and Xtr) of the interconnection transformer 4 and the output current Iac on the d-q coordinates, it becomes the following expression (11).

[Expression 11]

$$\dot{V}_{tr} = \begin{bmatrix} V_{tr\_d} \\ V_{tr\_q} \end{bmatrix} = \begin{bmatrix} Rtr & -Xtr \\ Xtr & Rtr \end{bmatrix} \begin{bmatrix} I_{ac\_d} \\ I_{ac\_q} \end{bmatrix} \quad (11)$$

From the voltage drop Vz, the operating point where the amplitude of the interconnection point voltage Vsys of the power system (the power grid) is |V|* and also the internal induced voltage Ef is positioned on the d-axis can be uniquely (univocally) determined, and it becomes the following expressions (12) to (14).

[Expression 12]

$$\delta = \sin^{-1}\left(\frac{V_{z\_q}}{|V|^*}\right) \quad (12)$$

[Expression 13]

$$\dot{E}_f = \begin{bmatrix} |V|^* \cos\delta + V_{z\_d} \\ 0 \end{bmatrix} \quad (13)$$

[Expression 14]

$$\dot{V}_{sys} = \dot{E}_f - \dot{V}_z = \begin{bmatrix} |V|^* \cos\delta \\ -V_{z\_q} \end{bmatrix} \quad (14)$$

The above expression (12) can be obtained by the sin⁻¹ calculation unit 65 in FIG. 14. The above expression (13) can be obtained by the multiplier 67 and the adder 68. Further, the above expression (14) is clear from a relationship between Ef, Vz_d and Vsys shown in the vector diagram of FIG. 13.

The voltage drop Vtr of the interconnection transformer 4 is added to the calculated system voltage Vsys as expressed in the following expression (15), then it becomes the output voltage command value Vac*.

[Expression 15]

$$\dot{V}_{ac}^* = \dot{V}_{sys} + \dot{V}_{tr} = \begin{bmatrix} |V|^* \cos\delta + V_{tr\_d} \\ -V_{z\_q} + V_{tr\_q} \end{bmatrix} \quad (15)$$

The added voltage drop Vtr of the interconnection transformer 4 is cancelled out by an actually generated voltage drop, so that the system voltage Vsys calculated by the expression (14) appears at an upper side of the interconnection transformer 4.

As described above, according to the embodiment 5, by sequentially calculating, according to the load current, the output voltage command value Vac* and the internal induced voltage Ef of the operating point where the amplitude of the system voltage Vsys is the voltage amplitude command value |V|*, the internal induced voltage Ef is positioned on the d-axis and also the voltage drop due to the interconnection transformer is cancelled out, it is possible to simulate the voltage drop caused by the virtual synchronous impedance and reproduce the synchronizing power while maintaining the system voltage amplitude constant even at a time of load fluctuation.

Embodiment 6

Figure 15:
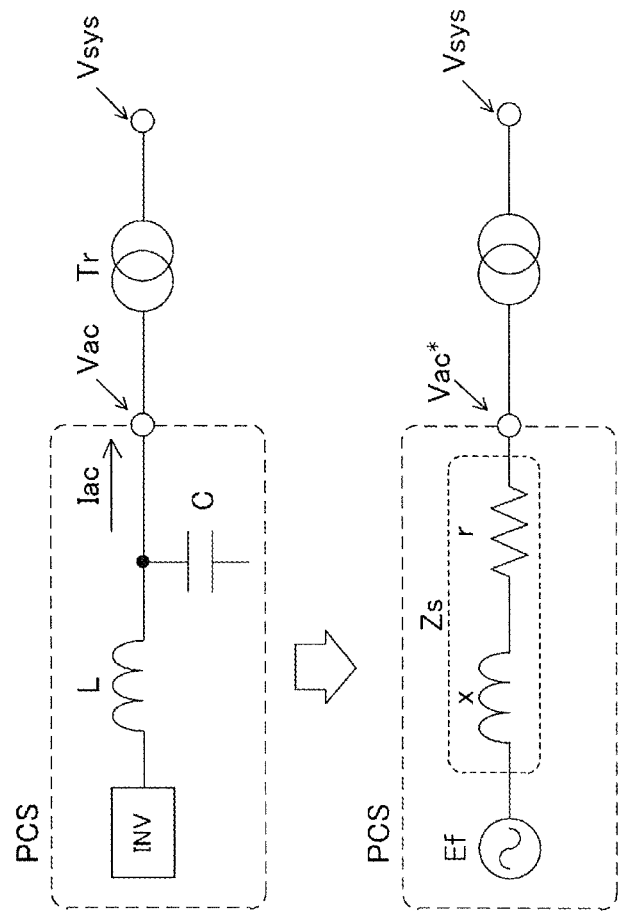
FIG. 15 is an explanatory drawing of a virtual impedance model according to an embodiment 6 of the present invention.
Figure 16:
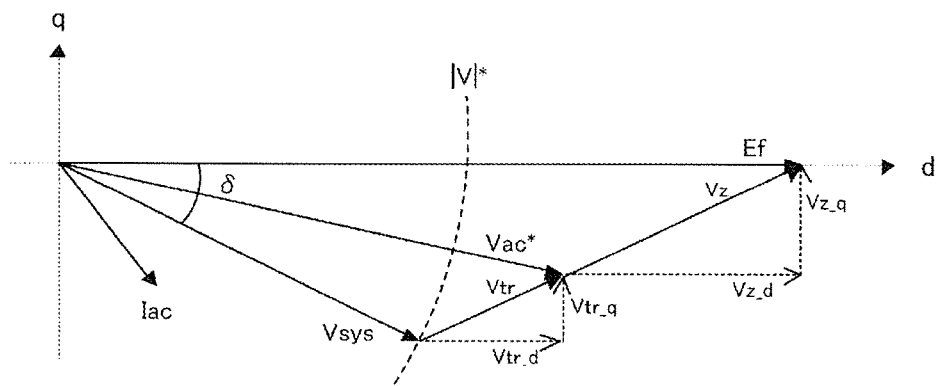
FIG. 16 is a vector diagram of a virtual synchronous impedance model according to the embodiment 6 of the present invention.

The virtual impedance model according to an embodiment 6 is shown in FIG. 15. In the embodiment 6, a relationship between the output current detection value Iac, the output voltage command value Vac*, the internal induced voltage Ef, the output voltage phase δ, the voltage amplitude command value |V|*, the voltage drops Vz_d and Vz_q at the virtual synchronous impedance Zs, the system voltage (the interconnection point voltage) Vsys and the voltage drops Vtr_d and Vtr_q due to the interconnection transformer 4 on the d-axis and the q-axis is shown in FIG. 16, with the internal induced voltage Ef being set as a reference phase (on the d-axis).

In the above embodiment 5, the voltage drop due to the interconnection transformer 4 is compensated in whole. However, in the present embodiment 6, only an amount of a drop of the system voltage (Vsys) amplitude from the voltage amplitude command value |V|* is compensated. When viewed from the system (the grid) (i.e. from the Vsys side), in the embodiment 5, as shown in FIG. 11, it looks as if only the internal induced voltage Ef and the virtual synchronous impedance Zs exist (because the voltage drop due to the interconnection transformer 4 is cancelled out). On the other hand, in the embodiment 6, as shown in FIG. 15, the impedance of the interconnection transformer 4 can also been seen, which is a different point from the embodiment 5.

Figure 17:
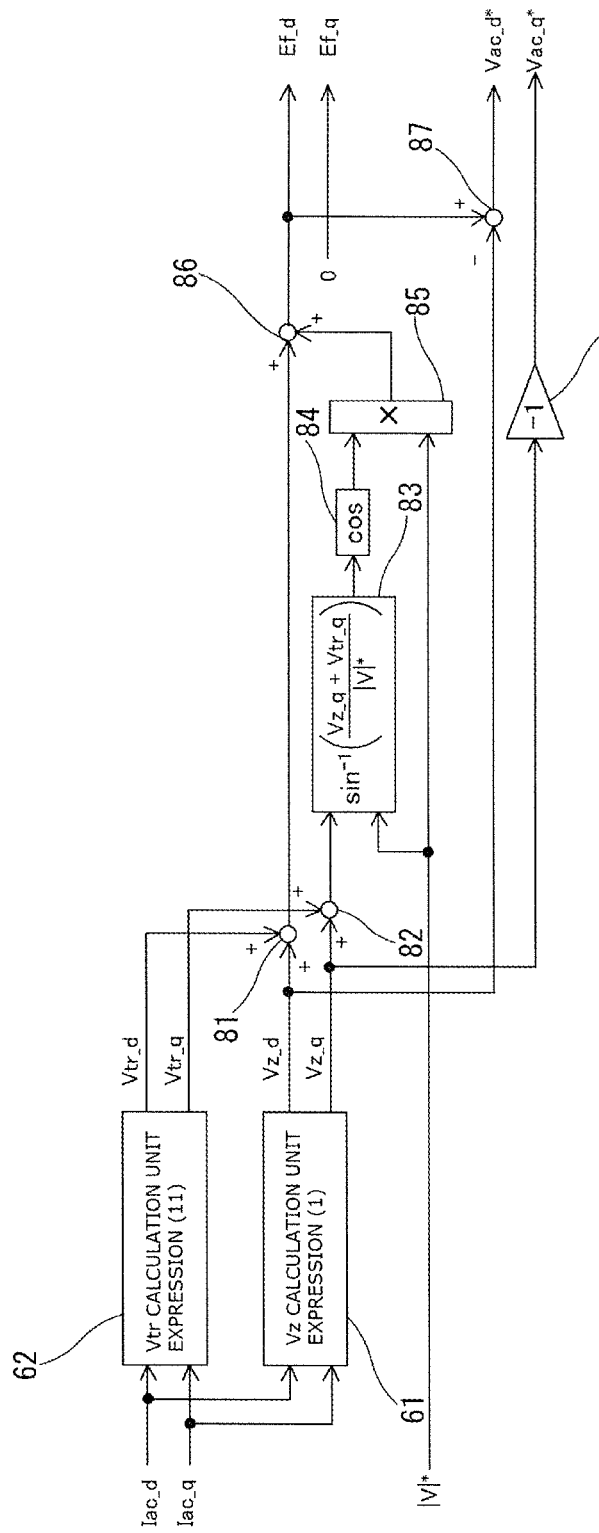
FIG. 17 is a block diagram of a virtual synchronous impedance compensation block according to the embodiment 7 of the present invention.

The virtual synchronous impedance compensation block 11 in the embodiment 6 is configured as shown in FIG. 17. In FIG. 17, the same elements are denoted by the same reference signs as those of FIG. 14.

A reference sign 81 is an adder (a first adder) that adds the voltage drop Vtr_d calculated by the Vtr calculation unit 62 to the voltage drop Vz_d calculated by the Vz calculation unit 61.

A reference sign 82 is an adder (a second adder) that adds the voltage drop Vtr_q calculated by the Vtr calculation unit 62 to the voltage drop Vz_q calculated by the Vz calculation unit 61.

A reference sign 83 is a $\sin^{-1}$ calculation unit that calculates the output voltage phase $\delta$ by calculating the following expression (16) on the basis of an output of the adder 82 and the set voltage amplitude command value $|V|^*$.

[Expression 16]

$$\delta = \sin^{-1}\left(\frac{V_{z\_q} + V_{tr\_q}}{|V|^*}\right) \quad (16)$$

A reference sign 84 is a cos calculation unit that calculates a cos $\delta$ that is a cos component of the output voltage phase $\delta$.

A reference sign 85 is a multiplier that multiplies the voltage amplitude command value $|V|^*$ by an output of the cos calculation unit 84.

A reference sign 86 is an adder (a third adder) that, by adding an addition output of the adder 81 to an output of the multiplier 85, outputs an internal induced voltage Ef_d of an operating point where the amplitude of the system voltage (the interconnection point voltage of the power system (the power grid)) Vsys is $|V|^*$, the internal induced voltage Ef exists on the d-axis and also a decrease in the amplitude among the voltage drop Vtr due to the transformer 4 is compensated.

A reference sign 87 is a subtractor that, by subtracting the voltage drop Vz_d calculated by the Vz calculation unit 61 from the internal induced voltage Ef_d output from the adder 86, outputs an output voltage command value Vac_d* of an operating point where the amplitude of the system voltage (the interconnection point voltage of the power system (the power grid)) Vsys is $|V|^*$, the internal induced voltage Ef exists on the d-axis and also the decrease in the amplitude among the voltage drop Vtr due to the transformer 4 is compensated.

A reference sign 88 is a polarity reverser that reverses a polarity of the voltage drop Vz_q output from the Vz calculation unit 61. An output of the polarity reverser 88 is output as an output voltage command value Vac_q*. Here, an internal induced voltage Ef_q is 0.

In the system configured as above, in the same manner as the embodiment 5, the voltage drop Vz by the virtual synchronous impedance Zs is obtained from the the following expression (1). Also, in the same manner as the embodiment 5, the voltage drop Vtr due to the interconnection transformer 4 is obtained from the following expression (11).

[Expression 1]

$$\dot{V}_Z = \begin{bmatrix} V_{z\_d} \\ V_{z\_q} \end{bmatrix} = \begin{bmatrix} r & -x \\ x & r \end{bmatrix}\begin{bmatrix} I_{ac\_d} \\ I_{ac\_q} \end{bmatrix} \quad (1)$$

[Expression 11]

$$\dot{V}_{tr} = \begin{bmatrix} V_{tr\_d} \\ V_{tr\_q} \end{bmatrix} = \begin{bmatrix} Rtr & -Xtr \\ Xtr & Rtr \end{bmatrix}\begin{bmatrix} I_{ac\_d} \\ I_{ac\_q} \end{bmatrix} \quad (11)$$

From the voltage drops Vz and Vtr, the operating point where the system voltage (Vsys) amplitude is $|V|^*$ and also the internal induced voltage Ef is positioned on the d-axis can be uniquely (univocally) determined, and it becomes the following expressions (16) to (19).

[Expression 16]

$$\delta = \sin^{-1}\left(\frac{V_{z\_q} + V_{tr\_q}}{|V|^*}\right) \quad (16)$$

[Expression 17]

$$\dot{E}_f = \begin{bmatrix} |V|^*\cos\delta + V_{tr\_d} + V_{z\_d} \\ 0 \end{bmatrix} \quad (17)$$

[Expression 18]

$$\dot{V}_{sys} = \dot{E}_f - \dot{V}_Z - \dot{V}_{tr} = \begin{bmatrix} |V|^*\cos\delta \\ -V_{z\_q} - V_{tr\_q} \end{bmatrix} \quad (18)$$

[Expression 19]

$$\dot{V}_{ac}^* = \dot{E}_f - \dot{V}_Z = \begin{bmatrix} |V|^*\cos\delta + V_{tr\_d} \\ -V_{z\_q} \end{bmatrix} \quad (19)$$

The above expression (16) can be obtained by the $\sin^{-1}$ calculation unit 83 in FIG. 17. The above expression (17) can be obtained by the adder 86 in FIG. 17. The above expression (18) is clear from a relationship between vectors Vsys, Ef, Vz and Vtr in FIG. 16. Further, the above expression (19) is clear from a relationship between vectors Ef, Vz and Vac* in FIG. 16.

As described above, according to the embodiment 6, by sequentially calculating, according to the load current, the output voltage command value Vac* and the internal induced voltage Ef of the operating point where the amplitude of the system voltage Vsys is the voltage amplitude command value $|V|^*$, the internal induced voltage Ef is positioned on the d-axis and also the decrease in the amplitude among the voltage drop due to the interconnection transformer is compensated, it is possible to simulate the voltage drop caused by the virtual synchronous impedance and reproduce the synchronizing power while maintaining the system voltage amplitude constant even at a time of load fluctuation.

The invention claimed is:

1. A control system of a power conversion system having a power converter that controls a virtual synchronous generator simulating a synchronous generator and converts DC (direct current) power of a DC power supply into AC (alternating current) power, wherein an output of the power converter is interconnected to a power grid through an LC (inductor-capacitor) filter and an interconnection transformer, the control system comprising: a virtual synchronous impedance compensation block configured to input and output current detection value obtained by detecting an output current of the power converter and a set voltage amplitude command value $|V|^*$, simulate voltage drops generated by flow of the output current of the power converter to a virtual synchronous impedance and the transformer, and calculate an output voltage command value Vac* and an internal induced voltage Ef of the virtual synchronous generator according to the simulated voltage drops; a virtual synchronous generator model configured to determine an angular frequency simulating the synchronous generator; and an output voltage control unit configured to perform control so that an output voltage Vac of the power conversion system coincides with the output voltage command value Vac* calculated by the virtual synchronous impedance compensation block, wherein the virtual synchronous impedance compensation block is configured to, from the output current detection value Iac, the virtual synchronous impedance Zs, an impedance Ztr of the transformer and the set voltage amplitude command value |V|*, calculate the output voltage command value Vac* and the internal induced voltage Ef of an operating point where an amplitude of an interconnection point voltage Vsys of the power grid is |V|* and also the internal induced voltage Ef exists on a d-axis, with the internal induced voltage Ef being set as a reference phase.

2. The control system of the power conversion system as claimed in claim 1, wherein the virtual synchronous impedance compensation block has a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by performing a rotational coordinate conversion of the output current detection value Iac with an internal phase that is determined from the angular frequency determined by the virtual synchronous generator model;

[Expression 1]

$$\dot{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)

a Vtr calculation unit configured to calculate a voltage drop Vtr caused by the transformer by calculating the following expression (11) on the basis of the d-axis current detection value Iac_d and the q-axis current detection value Iac_q each obtained by converting the output current detection value Iac into the d-axis and a q-axis and the impedance Ztr of the transformer;

[Expression 11]

$$\dot{V}_{tr} = \begin{bmatrix} V_{tr\_d} \\ V_{tr\_q} \end{bmatrix} = \begin{bmatrix} Rtr & -Xtr \\ Xtr & Rtr \end{bmatrix} \begin{bmatrix} I_{ac\_d} \\ I_{ac\_q} \end{bmatrix} \quad (11)$$

(Here, Rtr is a resistance component of Ztr, and Xtr is a reactance component of Ztr)

a $\sin^{-1}$ calculation unit configured to calculate a grid voltage phase δ by calculating the following expression (12) on the basis of the voltage drop Vz_q calculated by the Vz calculation unit and the voltage amplitude command value |V|*;

[Expression 12]

$$\delta = \sin^{-1}\left(\frac{V_{Z\_q}}{|V|^*}\right) \quad (12)$$

a cos calculation unit configured to calculate a cos δ that is a cos component of the grid voltage phase δ;

a multiplier configured to multiply the voltage amplitude command value |V|* by an output of the cos calculation unit;

an adder configured to, by adding the voltage drop Vz_d calculated by the Vz calculation unit to a multiplication output of the multiplier, output an internal induced voltage Ef_d of an operating point where the amplitude of the interconnection point voltage Vsys of the power grid is |V|*, the internal induced voltage Ef exists on the d-axis and also compensation is performed so as to cancel out the voltage drop Vtr due to the transformer;

a first subtractor configured to subtract a voltage drop Vtr_d calculated by the Vtr calculation unit from the voltage drop Vz_d calculated by the Vz calculation unit;

a second subtractor configured to, by subtracting a subtraction output of the first subtractor from the internal induced voltage Ef_d calculated by the adder, output an output voltage command value Vac_d* of the operating point where the amplitude of the interconnection point voltage Vsys of the power grid is |V|*, the internal induced voltage Ef exists on the d-axis and also compensation is performed so as to cancel out the voltage drop Vtr due to the transformer;

a third subtractor configured to subtract a voltage drop Vtr_q calculated by the Vtr calculation unit from the voltage drop Vz_q calculated by the Vz calculation unit; and a polarity reverser configured to reverse a polarity of a deviation output of the third subtractor and output an output voltage command value Vac_q*, and the control of the output voltage control unit is performed on d-q coordinates obtained by performing a rotational coordinate conversion with the internal phase that is determined from the angular frequency determined by the virtual synchronous generator model.

3. The control system of the power conversion system as claimed in claim 1, wherein the virtual synchronous impedance compensation block has a Vz calculation unit configured to calculate voltage drops Vz_d and Vz_q caused by the virtual synchronous impedance Zs by calculating the following expression (1) on the basis of a d-axis current detection value Iac_d and a q-axis current detection value Iac_q each obtained by performing a rotational coordinate conversion of the output current detection value Iac with an internal phase that is determined from the angular frequency determined by the virtual synchronous generator model;

[Expression 1]

$$\dot{V}_Z = \begin{bmatrix} V_{Z\_d} \\ V_{Z\_q} \end{bmatrix} = \begin{bmatrix} r & -x \\ x & r \end{bmatrix} \begin{bmatrix} I_{ac\_d} \\ I_{ac\_q} \end{bmatrix} \quad (1)$$

(Here, r is a resistance component of Zs, and x is a reactance component of Zs)

a Vtr calculation unit configured to calculate a voltage drop Vtr caused by the transformer by calculating the following expression (11) on the basis of the d-axis current detection value Iac_d and the q-axis current detection value Iac_q each obtained by converting the output current detection value Iac into the d-axis and a q-axis and the impedance Ztr of the transformer;

[Expression 11]

$$\dot{V}_{tr} = \begin{bmatrix} V_{tr\_d} \\ V_{tr\_q} \end{bmatrix} = \begin{bmatrix} Rtr & -Xtr \\ Xtr & Rtr \end{bmatrix} \begin{bmatrix} I_{ac\_d} \\ I_{ac\_q} \end{bmatrix} \quad (11)$$

(Here, Rtr is a resistance component of Ztr, and Xtr is a reactance component of Ztr)

a first adder configured to add a voltage drop Vtr_d calculated by the Vtr calculation unit to the voltage drop Vz_d calculated by the Vz calculation unit;

a second adder configured to add a voltage drop Vtr_q calculated by the Vtr calculation unit to the voltage drop Vz_q calculated by the Vz calculation unit;

a $\sin^{-1}$ calculation unit configured to calculate a grid voltage phase $\delta$ by calculating the following expression (16) on the basis of an addition output of the second adder and the voltage amplitude command value |V|*;

[Expression 16]

$$\delta = \sin^{-1}\left(\frac{V_{Z\_q} + V_{tr\_q}}{|V|^*}\right) \quad (16)$$

a cos calculation unit configured to calculate a cos $\delta$ that is a cos component of the grid voltage phase $\delta$;

a multiplier configured to multiply the voltage amplitude command value |V|* by an output of the cos calculation unit;

a third adder configured to, by adding an addition output of the first adder to a multiplication output of the multiplier, output an internal induced voltage Ef_d of an operating point where the amplitude of the interconnection point voltage Vsys of the power grid is |V|*, the internal induced voltage Ef exists on the d-axis and also a decrease in the amplitude among the voltage drop due to the transformer is compensated;

a subtractor configured to, by subtracting the voltage drop Vz_d calculated by the Vz calculation unit from the internal induced voltage Ef_d calculated by the third adder, output an output voltage command value Vac_d* of the operating point where the amplitude of the interconnection point voltage Vsys of the power grid is |V|*, the internal induced voltage Ef exists on the d-axis and also the decrease in the amplitude among the voltage drop due to the transformer is compensated; and a polarity reverser configured to reverse a polarity of the voltage drop Vz_q calculated by the Vz calculation unit and output an output voltage command value Vac_q*, and the control of the output voltage control unit is performed on d-q coordinates obtained by performing a rotational coordinate conversion with the internal phase that is determined from the angular frequency determined by the virtual synchronous generator model.

* * * * *